US011629699B2

(12) United States Patent
Jensen et al.

(10) Patent No.: US 11,629,699 B2
(45) Date of Patent: Apr. 18, 2023

(54) APPARATUSES FOR WIND TURBINE BLADE RAILROAD TRANSPORTATION AND RELATED SYSTEMS AND METHODS

(71) Applicant: Vestas Wind Systems A/S, Aarhus (DK)

(72) Inventors: Kurt Jensen, Aarhus (DK); Henrik Timm Sørensen, Hadsten (DK)

(73) Assignee: Vestas Wind Systems A/S, Aarhus N (DK)

( * ) Notice: Subject to any disclaimer, the term of this patent is extended or adjusted under 35 U.S.C. 154(b) by 476 days.

(21) Appl. No.: 17/011,308

(22) Filed: Sep. 3, 2020

(65) Prior Publication Data
US 2021/0071644 A1 Mar. 11, 2021

(30) Foreign Application Priority Data

Sep. 6, 2019 (DK) .......................... PA 2019 70559

(51) Int. Cl.
*F03D 13/40* (2016.01)
*B65G 67/12* (2006.01)
*B61D 47/00* (2006.01)

(52) U.S. Cl.
CPC ............ *F03D 13/40* (2016.05); *B61D 47/00* (2013.01); *B65G 67/12* (2013.01); *F05B 2260/02* (2013.01)

(58) Field of Classification Search
CPC ....... F03D 13/40; B61D 45/003; B61D 47/00; F05B 2206/20; B65G 67/12
See application file for complete search history.

(56) References Cited

U.S. PATENT DOCUMENTS

| 7,591,621 | B1* | 9/2009 | Landrum ................ F03D 13/40 410/44 |
| 8,985,920 | B2* | 3/2015 | Bitsch .................... F03D 13/40 410/44 |
| 9,638,162 | B1* | 5/2017 | Fletcher ................ B60P 1/6409 |
| 9,790,927 | B1 | 10/2017 | Landrum et al. |
| 10,738,766 | B2* | 8/2020 | Fletcher .............. B61D 45/003 |
| 2011/0031292 | A1* | 2/2011 | Krogh .................... F03D 13/40 224/570 |

(Continued)

FOREIGN PATENT DOCUMENTS

WO 2009141018 A2 11/2009
WO 2010020297 A1 2/2010
(Continued)

OTHER PUBLICATIONS

Danish Patent and Trademark Office, Search and Examination Repjort in PA 2019 70559, dated Feb. 28, 2020.

*Primary Examiner* — Kaitlin S Joerger
(74) *Attorney, Agent, or Firm* — Wood Herron & Evans LLP

(57) ABSTRACT

A tip bolster (32) for supporting a wind turbine blade (40) on a railcar (14) includes a clamp (360) including first and second clamp arms (364, 366) having first and second jaws (384, 386), respectively, and being configured to be selectively movable relative to each other in a clamping direction for applying and releasing a clamping force on the blade (40) interposed therebetween, via the first and second jaws (384, 386), wherein the first and second clamp arms (364, 366) are configured to be urged relatively toward each other in response to a decrease in the clamping force.

20 Claims, 22 Drawing Sheets

(56) References Cited

U.S. PATENT DOCUMENTS

| | | | |
|---|---|---|---|
| 2013/0343827 A1* | 12/2013 | Schibsbye | F03D 13/40 410/45 |
| 2015/0337799 A1* | 11/2015 | Hansen | B60P 3/40 410/44 |
| 2016/0017861 A1* | 1/2016 | Sigurdsson | F03D 13/40 410/45 |
| 2016/0201644 A1* | 7/2016 | Thomsen | F03D 13/40 410/44 |
| 2018/0223811 A1 | 8/2018 | Fletcher et al. | |
| 2019/0299392 A1* | 10/2019 | Üyünük | F16M 11/18 |
| 2022/0154698 A1* | 5/2022 | Mathiasen | F03D 13/40 |

FOREIGN PATENT DOCUMENTS

| | | |
|---|---|---|
| WO | 2011098086 A1 | 8/2011 |
| WO | 2015021989 A1 | 2/2015 |

* cited by examiner

US 11,629,699 B2

APPARATUSES FOR WIND TURBINE BLADE RAILROAD TRANSPORTATION AND RELATED SYSTEMS AND METHODS

TECHNICAL FIELD

This invention generally relates to wind turbines, and more particularly to apparatuses, systems, and methods for transporting a wind turbine blade via railroad.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades extending from a hub and supported in the nacelle by means of a shaft. The shaft couples the rotor either directly or indirectly with a generator, which is housed inside the nacelle. Consequently, as wind forces the blades to rotate, electrical energy is produced by the generator.

Transportation of wind turbine blades from their production site to their installation location or to an interim storage site poses a variety of technical challenges, particularly in view of the ever-increasing size of individual blades. For example, the lengths of some modern wind turbine blades may be in the vicinity of approximately 250 feet (or approximately 80 m). It is often desirable or necessary to transport such blades via railroad. However, transportation of such long blades can present significant challenges for railroad transportation. For example, railroad profiles (e.g., side clearances) are typically tightly limited and the trains must negotiate curved sections of railroad as well as complex and/or crowded rail yards. As a result, long blades often span across multiple railcars for improved maneuvering around curves, junctions, or other potential railroad or railroad-side obstructions.

In many cases, a train includes first and second railcars operatively coupled to each other for hauling by a locomotive, and a root end of the blade is supported on the first railcar via a vertically pivotable root bolster and a region of the blade near a tip end thereof is supported on the second railcar via a vertically pivotable tip bolster. One or more additional railcars may be operatively coupled to the first and second railcars, such as between the first and second railcars. In any event, the blade may be supported by the root bolster at the root end and may be supported by the tip bolster at a location along the blade spaced apart from the tip end.

In this regard, the tip bolster may be positioned somewhat inboard from the actual tip end of the blade (e.g., approximately one-quarter of the blade length therefrom) since the actual tip end of the blade may be too delicate to adequately support the weight of the blade, while the root bolster is typically positioned at the actual root end where the strength of the blade is often relatively high. By supporting the tip end region and root end of the blade on the vertically pivotable bolsters on separate railcars, the blade may be able to "cut corners" as the railcars travel along the railroad. In this regard, the blade may typically overlie the train including the first and second railcars, as well as any additional railcars therebetween, as the train traverses a straight section of the railroad such that the railcars are longitudinally aligned with each other. However, as the train rounds a curved section of the railroad such that the railcars become longitudinally offset from each other, a middle region of the blade between the vertical pivot axes of the bolsters may extend outside the train's footprint on the inside of the curve to "bridge" over the space alongside the train that is radially inward of the train. In some cases, the tip end of the blade may likewise extend outside the train's footprint on the outside of the curve to "swing out" over the space alongside the train that is radially outward of the train.

Such prior art arrangements may not be suitable for transporting blades having lengths greater than a particular threshold length via a particular section of railroad. In this regard, the available clearances alongside a railroad for accommodating a bridging middle region of a blade and for accommodating a swinging out tip end of a blade may be very limited. For example, there may be insufficient available clearance inside of the curve of a curved section of the railroad to accommodate the middle region of a particularly long blade as the railcars round the curved section. An obstruction may be located along the railroad on a radially inward side thereof which would impede the middle region of the blade from safely bridging radially inwardly of the train as the railcars travel along the railroad. More particularly, the middle region of the blade could collide with such an obstruction, thereby damaging the blade and potentially rendering the blade unusable. This problem typically cannot be resolved by only adjusting the position of the tip bolster (and thus, of the associated vertical pivot axis) to allow the tip end of the blade to swing out farther radially outwardly of the train, since other obstructions may be located along the railroad on a radially outward side thereof which would similarly impede the tip end of the blade from safely swinging out farther as the railcars travel along the railroad.

Many sections of railroad are provided with a predetermined side clearance boundary along either side thereof. Such side clearance boundaries are typically expressed as a horizontal distance from a centerline of the railroad, and may vary depending on various characteristics of a particular section of railroad, such as a curvature thereof. For example, a predetermined side clearance boundary of a railroad may be defined as a particular horizontal distance from the centerline of the railroad and may be determined based on a radius of lateral curvature of the railroad (e.g., measured to the centerline of the railroad). Together, the side clearance boundaries may define a horizontal operating envelope available for occupation by the train including the railcars and any associated equipment and/or cargo carried thereby.

In one example, a first curved section of railroad for facilitating a 13° degree right turn of the train may have a radius of approximately 442 feet (approx. 135 m) lateral curvature (e.g., measured to the centerline of the railroad), a radially inward side clearance boundary defined approximately 9 feet (approx. 2.5 m) from the centerline of the railroad, and a radially outward side clearance boundary defined approximately 11 feet (approx. 3.5 m) from the centerline of the railroad to provide a horizontal operating envelope having a total width of approximately 20 feet (approx. 6 m). In another example, a second curved section of railroad for facilitating a 13° degree left turn of the train may have a radius of approximately 442 feet (approx. 135 m) lateral curvature (e.g., measured to the centerline of the railroad), a radially inward side clearance boundary defined approximately 12 feet (approx. 4 m) from the centerline of the railroad, and a radially outward side clearance boundary defined approximately 14 feet (approx. 4.5 m) from the centerline of the railroad to provide a horizontal operating envelope having a total width of approximately 26 feet (approx. 8 m).

Such first and second curved sections may be impassable for a wind turbine blade having a length greater than a certain threshold length and carried by the train using the prior art arrangement described above. For example, a blade having a length of approximately 245 feet (approx. 75 m) would be incapable of remaining within the horizontal operating envelopes of such curved sections using the prior art arrangement. In particular, the bridging middle region of the blade and/or the swinging out tip end of the blade would protrude beyond the provided side clearance boundaries and thus encounter potential obstructions. Therefore, it may be difficult or impossible to transport blades of certain lengths via certain sections of railroad using such prior art techniques.

Moreover, in some cases, the blade may be operatively coupled to the respective railcar(s) via a clamp positioned around a region (e.g., a tip end region) of the blade. The clamp may frictionally engage the blade to restrain the blade on the railcar. Thus, acceleration of the railcar may be transmitted to the blade via the clamp. Likewise, braking action of the railcar may be transmitted to the blade via the clamp. However, the frictional engagement of the clamp with the blade may be undermined during transportation if the blade drifts or creeps forward or backward relative to the clamp, which could ultimately result in the blade slipping free from the clamp. On the other hand, the clamp may be applied excessively tightly around the blade in an effort to prevent such slippage, which may inadvertently cause the clamp to compressively damage the blade thereby compromising the structural integrity of the blade and rendering the blade unusable. Moreover, the interface between the blade and the clamp may be subjected to vibrations and shocks during transportation which may cause unexpected decreases in the clamping force applied to the blade. Current clamping systems do not provide any means to account for these undesirable changes in the applied clamping force.

Manufacturers of wind turbines and wind turbine components continually strive to improve systems and methods associated with the transportation and handling of wind turbine blades. It would therefore be desirable to provide improved apparatuses, system, and methods for transporting a wind turbine blade via railroad that accommodate maximized blade lengths and ensure a sufficiently firm clamping action on the blade to restrain the blade during transportation.

SUMMARY

In one embodiment, a tip bolster for supporting a wind turbine blade on a railcar includes a clamp including first and second clamp arms having first and second jaws, respectively, and being configured to be selectively movable relative to each other in a clamping direction for applying and releasing a clamping force on the blade interposed therebetween, via the first and second jaws, wherein the first and second clamp arms are configured to be urged relatively toward each other in response to a decrease in the clamping force. A decrease in the clamping force may alternatively be understood or expressed as a shift in position of the clamped blade. The clamp may further include at least one mechanical energy storage device configured to selectively store and release energy for urging at least one of the first and second clamp arms relatively toward the other of the first and second clamp arms in response to the decrease in the clamping force. For example, the at least one mechanical energy storage device may include at least one spring.

The clamp may include at least one guide rod extending parallel to the clamping direction, and the second clamp arm may be movable toward and away from the first clamp arm along the at least one guide rod. In this regard, the clamp may further include an actuator configured to effect movement of the second clamp arm along the at least one guide rod. For example, the actuator may include a rotatable drive screw extending parallel to the clamping direction and a drive plate including at least one through-bore configured to slidably receive the at least one guide rod and a threaded bore configured to threadably receive the drive screw, such that rotation of the drive screw effects movement of the drive plate along the guide rods for urging the second clamp arm toward the first clamp arm and for allowing the second clamp arm to be moved away from the first clamp arm. The actuator may further include at least one mechanical energy storage device positioned between the drive plate and the second clamp arm and configured to selectively store and release energy between the drive plate and the second clamp arm for urging the second clamp arm toward the first clamp arm in response to the decrease in the clamping force. For example, the at least one mechanical energy storage device may include at least one spring. The at least one spring may be positioned about the at least one guide rod. In addition or alternatively, the at least one spring may be configured to be pre-loaded by the drive plate in response to continued movement of the drive plate toward the first clamp arm after the second jaw presses the blade against the first jaw. In this regard, the at least one spring may be configured to expand in response to the decrease in the clamping force to urge the second clamp arm toward the first clamp arm.

The clamp may include at least one spring-loaded separator extending between the first and second clamp arms for biasing the first and second clamp arms relatively away from each other in the clamping direction. In addition or alternatively, the tip bolster may include a turntable configured to be pivotable relative to the railcar about a vertical axis, wherein the clamp is supported by the turntable. The tip bolster may include a carriage configured to be translatable along the railcar in a longitudinal direction thereof, wherein the clamp is supported by the carriage. A transportation arrangement may include the tip bolster positioned on and pivotable relative to a first railcar about a first vertical axis, a root bolster positioned on and pivotable relative to a second railcar about a second vertical axis, and a blade pivotably supported on the first railcar via the tip bolster and pivotably supported on the second railcar via the root bolster.

In another embodiment, a method of transporting a wind turbine blade includes providing a railcar and a tip bolster mounted to the railcar, wherein the tip bolster includes a clamp having first and second clamp arms having first and second jaws, respectively. The method also includes interposing the blade between the first and second clamp arms and selectively moving the first and second clamp arms relatively toward each other in a clamping direction for applying a clamping force on the blade via the first and second jaws. The method further includes urging the first and second clamp arms relatively toward each other in the clamping direction in response to a decrease in the clamping force. Urging the first and second clamp arms relatively toward each other may include selectively releasing energy from at least one mechanical energy storage device to at least one of the first and second clamp arms in response to the decrease in the clamping force. For example, the at least one mechanical energy storage device may include at least one spring. In this regard, selectively moving the first and second clamp arms relatively toward each other may include pre-loading the at least one spring. In addition or alternatively, the method may include releasing the blade from the first and second jaws via at least one spring-loaded separator extending between the first and second clamp arms for biasing the first and second clamp arms relatively away from each other in the clamping direction

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
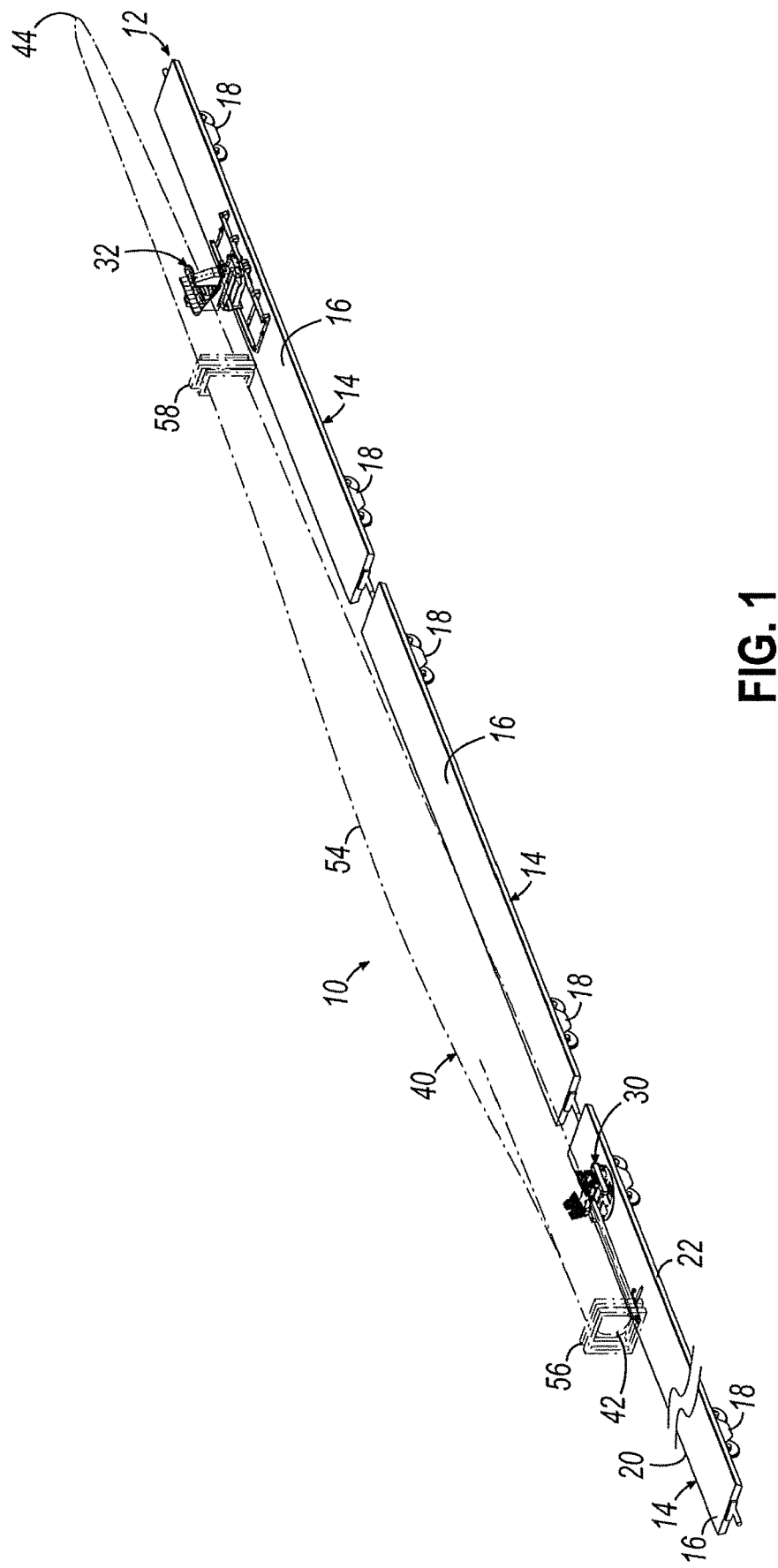
FIG. 1 is a perspective view of a transportation arrangement including a plurality of railcars, a wind turbine blade, a root bolster, and a tip bolster in accordance with an aspect of the invention.

With reference to FIG. 1, an exemplary transportation arrangement 10 includes a train 12 including a plurality of railcars 14 operatively coupled together for hauling by a locomotive along a railroad (not shown). The railcars 14 each have respective flat beds 16 and vertically pivotable trucks 18, and collectively define first and second sides 20, 22 of the train 12. The transportation arrangement 10 also includes vertically pivotable root and tip bolsters 30, 32 positioned on separate railcars 14, and a blade 40 supported by the root and tip bolsters 30, 32 such that the blade spans across multiple (e.g., at least two) railcars 14. As described in greater detail below, the root and tip bolsters 30, 32 may each be positioned at inboard locations along the blade 40 such that the blade 40 may be capable of swinging laterally outwardly from the first and/or second sides 20, 22 of the train at both ends thereof as the railcars 14 round a curved section of the railroad, for example, thereby allowing the blade 40 to have an increased length as compared to those allowed by prior art transportation arrangements. The tip bolster 32 may also be configured to automatically adjust a clamping force applied to the blade 40 by a portion of the tip bolster 32 in response to the applied clamping force falling below a desired amount to maintain a sufficiently firm and substantially continuous clamping action on the blade 40 to restrain the blade 40 during transportation.

Figure 2:
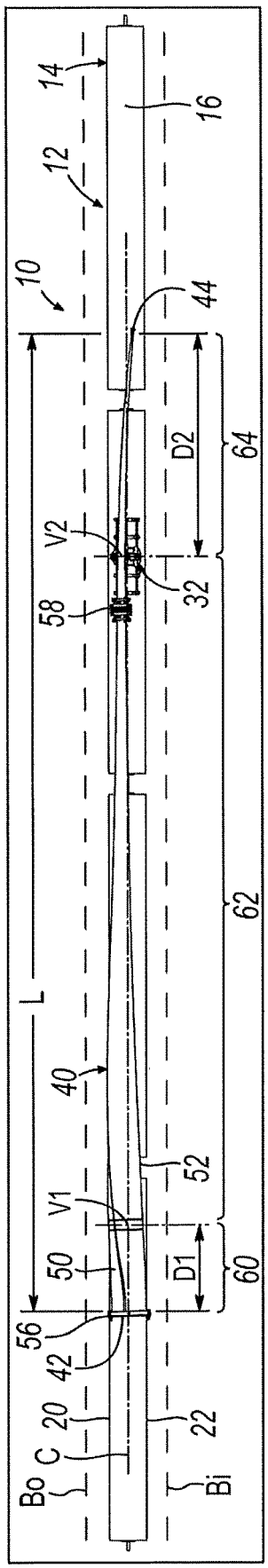
FIG. 2 is a top elevation view of the transportation arrangement of FIG. 1, showing the railcars traversing a straight section of railroad and longitudinally aligned with each other, and the wind turbine blade overlying the train.

The blade 40 may be of any suitable configuration and may include, for example, a root end 42, a tip end 44, a leading edge 46, a trailing edge 48 (FIG. 7D), a pressure side 50, and a suction side 52 (FIG. 2). As best shown in FIG. 2, the root end 42 and the tip end 44 of the blade 40 are spaced apart by a length L of the blade 40. In one embodiment, the length L of the blade 40 may be between approximately 150 feet (approx. 46 m) and approximately 300 feet (approx. 91 m). For example, the length L of the blade 40 may be approximately 245 feet (approx. 75 m). The leading edge 46 and the trailing edge 48 of the blade 40 are spaced apart by a chord which varies along the length L of the blade 40, and which is widest at a shoulder 54 of the blade 40. The illustrated blade 40 is outfitted with a root frame 56 rigidly coupled to the blade 40 at the root end 42 and a tip frame 58 rigidly coupled to the blade 40 between the shoulder 54 and the tip end 44 to provide lifting points for hoisting the blade 40, for example.

With continuing reference to FIG. 2, the train 12 may be configured to traverse a straight section of the railroad wherein a centerline C of the railroad is straight such that the railcars 14 are longitudinally aligned with each other. As a result, the blade 40 may be longitudinally aligned with and overlie the train 12, including the railcars 14 carrying the bolsters 30, 32 and any other railcars 14 therebetween. In other words, the blade 40 and, more particularly, both the root and tip ends 42, 44 thereof, may substantially lie within a horizontal footprint of the train 12 when viewed from above (although some relatively small portions of the exterior surface of the blade 40 may extend slightly beyond such a footprint, such as if a thickness of the blade 40 exceeds a width of one or more of the bed(s) 16 of the underlying railcar(s) 14). In any event, the blade 40 is clearly safely within a horizontal operating envelope defined between inner and outer side clearance boundaries Bi, Bo of the straight section of the railroad.

Figure 3:
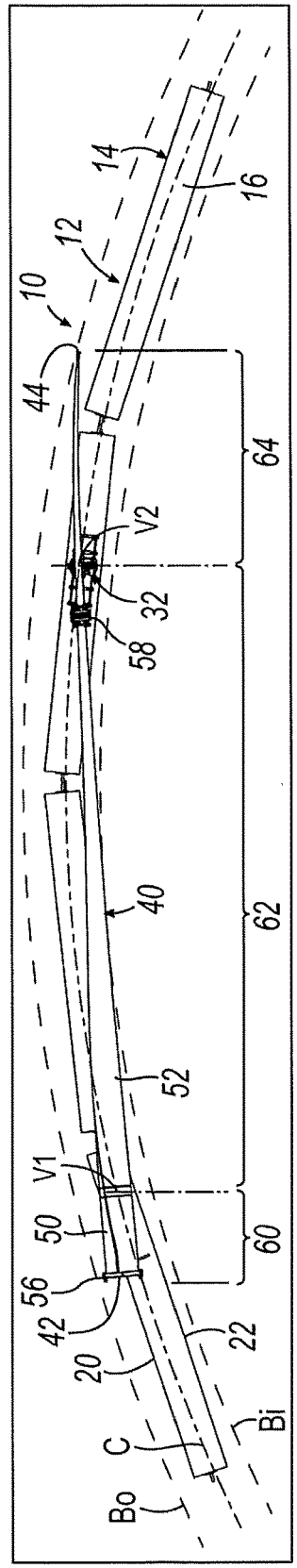
FIG. 3 is a top elevation view similar to FIG. 2, showing the railcars rounding a first curved section of railroad and longitudinally offset from each other, the middle region of the wind turbine blade bridging radially inwardly from the train, and the tip and root ends swinging radially outwardly from the train.
Figure 4:
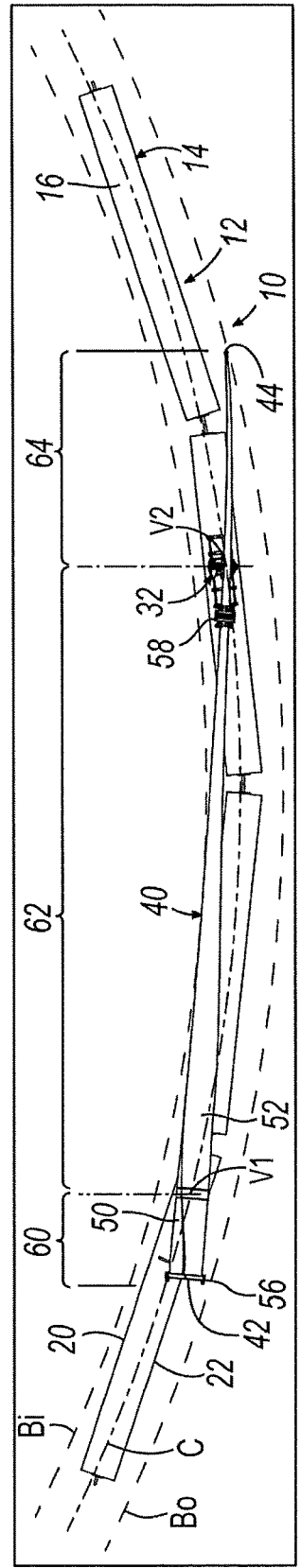
FIG. 4 is a top elevation view similar to FIG. 2, showing the railcars rounding a second curved section of railroad and longitudinally offset from each other, the middle region of the wind turbine blade bridging radially inwardly from the train, and the tip and root ends swinging radially outwardly from the train.

As shown in FIGS. 2-4, the blade 40 is pivotable relative to the bed 16 of the railcar 14 carrying the root bolster 30 about a first vertical axis V1 spaced apart from the root end 42 by a first distance D1 and defined by the root bolster 30, and the blade 40 is pivotable relative to the bed 16 of the railcar 14 carrying the tip bolster 32 about a second vertical axis V2 spaced apart from the tip end 44 by a second distance D2 and defined by the tip bolster 32. In the embodiment shown, the first vertical axis V1 is positioned between the root end 42 and the shoulder 54 of the blade 40. In any event, a root region 60 of the blade 40 may be defined between the root end 42 of the blade 40 and the first vertical axis V1, a middle region 62 of the blade 40 may be defined between the first and second vertical axes V1, V2, and a tip region 64 of the blade 40 may be defined between the tip end 44 of the blade 40 and the second vertical axis V2.

In one embodiment, the first distance D1 may be equal to approximately one-tenth of the length L of the blade 40. For example, the first distance D1 may be between approximately 20 feet (approx. 6 m) and approximately 40 feet (approx. 12 m). In the embodiment shown, the first distance D1 may be approximately 23 feet (approx. 7 m). In one embodiment, the second distance D2 may be equal to approximately one-quarter of the length L of the blade 40. For example, the second distance D2 may be between approximately 50 feet (approx. 15 m) and approximately 70 feet (approx. 21 m). In the embodiment shown, the second distance D2 may be approximately 56 feet (approx. 17 m). In one embodiment, the root bolster 30 and/or tip bolster 32 may be positioned directly above the truck 18 of the corresponding railcar 14, such that the respective vertical axis V1, V2 may be substantially coaxial with a vertical pivot axis of the underlying truck 18.

Thus, the root region 60 and the tip region 64 of the blade 40 may each be configured to extend laterally away from a radially outward side 20, 22 of the train 12, and the middle region 62 of the blade 40 may be configured to extend laterally away from a radially inward side 20, 22 of the train 12, when the railcars 14 carrying the bolsters 30, 32 are longitudinally offset from each other.

In this regard, and with reference to FIG. 3, the train 12 may be configured to round a first curved section of the railroad wherein the centerline C of the railroad is curved such that the railcars 14 are longitudinally offset from each other. For example, the first curved section may facilitate a 13° degree right turn of the train 12, and may have a radius of approximately 442 feet (approx. 135 m) lateral curvature (e.g., measured to the centerline C), a radially inward side clearance boundary Bi defined approximately 9 feet (approx. 2.5 m) from the centerline C of the railroad, and a radially outward side clearance boundary Bo defined approximately 11 feet (approx. 3.5 m) from the centerline C of the railroad to provide a horizontal operating envelope having a total width of approximately 20 feet (approx. 6 m). By positioning the root and tip bolsters 30, 32 and, thus, the respective vertical axes V1, V2, inboard of the respective ends 42, 44 of the blade 40, the middle region 62 of the blade 40 may bridge radially inwardly from the second side 22 of the train 12 without protruding beyond the radially inward side clearance boundary Bi, while the root and tip regions 60, 64 may each swing radially outwardly from the first side 20 of the train 12 without protruding beyond the radially outward side clearance boundary Bo. In other words, at least portions of each of the root region 60, middle region 62, and tip region 64 of the blade 40 may extend outside of the horizontal footprint of the train 12 when viewed from above, but the entire blade 40 including the root region 60, the middle region 62, and the tip region 64 may remain safely within the horizontal operating envelope as the train 12 rounds the first curved section of the railroad.

With reference to FIG. 4, the train 12 may be configured to round a second curved section of the railroad wherein the centerline C of the railroad is curved such that the railcars 14 are longitudinally offset from each other. For example, the second curved section may facilitate a 13° degree left turn of the train 12 may have a radius of approximately 442 feet (approx. 135 m) lateral curvature (e.g., measured to the centerline C), a radially inward side clearance boundary Bi defined approximately 12 feet (approx. 4 m) from the centerline C of the railroad, and a radially outward side clearance boundary Bo defined approximately 14 feet (approx. 4.5 m) from the centerline C of the railroad to provide a horizontal operating envelope having a total width of approximately 26 feet (approx. 8 m). By positioning the root and tip bolsters 30, 32 and, thus, the respective vertical axes V1, V2, inboard of the respective ends 42, 44 of the blade 40, the middle region 62 of the blade 40 may bridge radially inwardly from the first side 20 of the train 12 without protruding beyond the radially inward side clearance boundary Bi, while the root and tip regions 60, 64 may each swing radially outwardly from the second side 22 of the train 12 without protruding beyond the radially outward side clearance boundary Bo. In other words, as with the first curved section of the railroad described above, at least portions of each of the root region 60, middle region 62, and tip region 64 of the blade 40 may extend outside of the horizontal footprint of the train 12 when viewed from above, but the entire blade 40 including the root region 60, the middle region 62, and the tip region 64 may remain safely within the horizontal operating envelope as the train 12 rounds the second curved section of the railroad.

Therefore, the inboard positioning of the first and second vertical axes V1, V2, via the inboard positioning of the respective bolsters 30, 32, may allow the blade 40 to have a maximized length L which efficiently utilizes the available side clearances along the railroad while ensuring that the entire blade 40 avoids obstructions adjacent to the railroad beyond the side clearance boundaries Bi, Bo.

Figure 5:
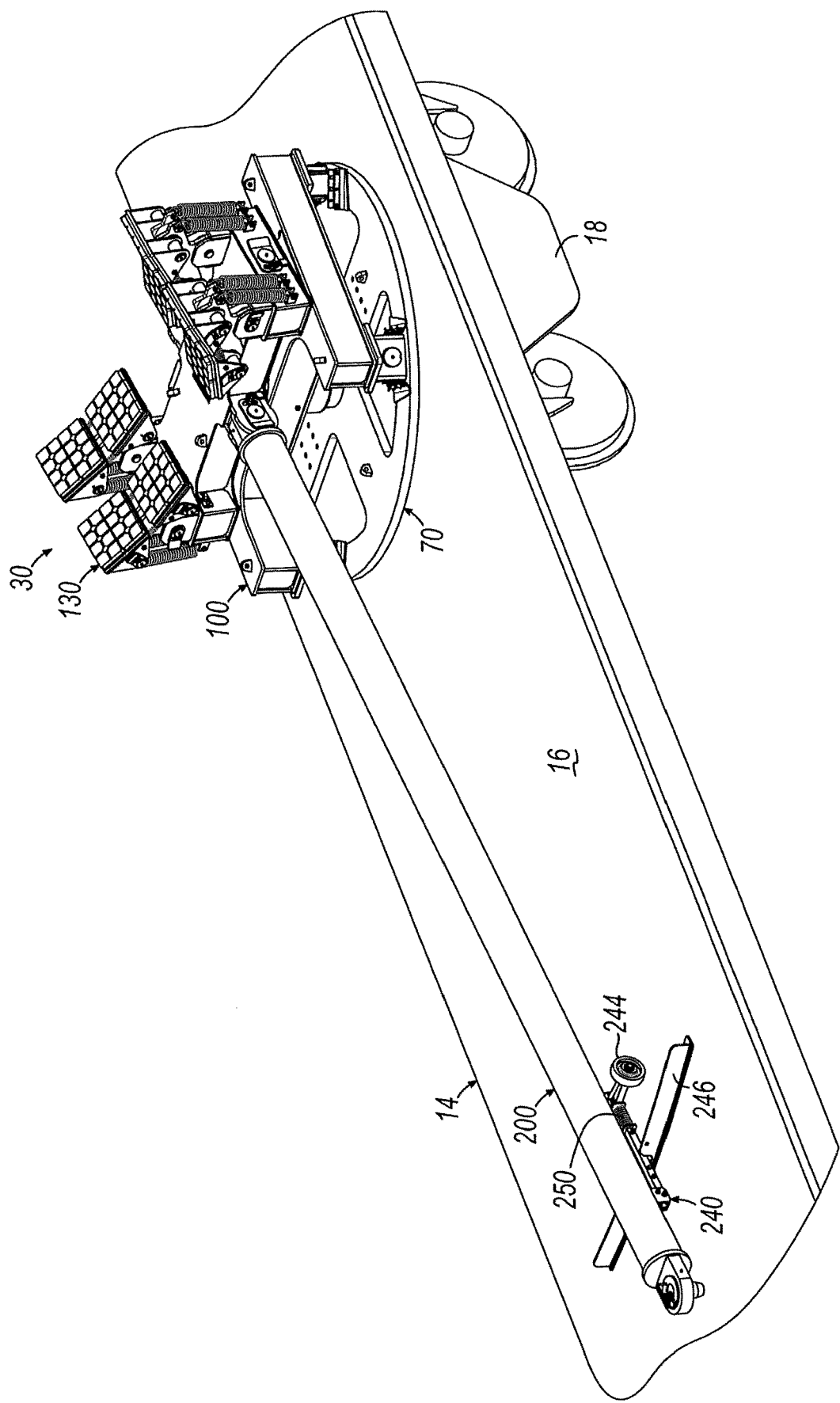
FIG. 5 is a front perspective view of the root bolster of FIG. 1 pivotably mounted to a root fixture fixed to the bed of the respective railcar.
Figure 5A:
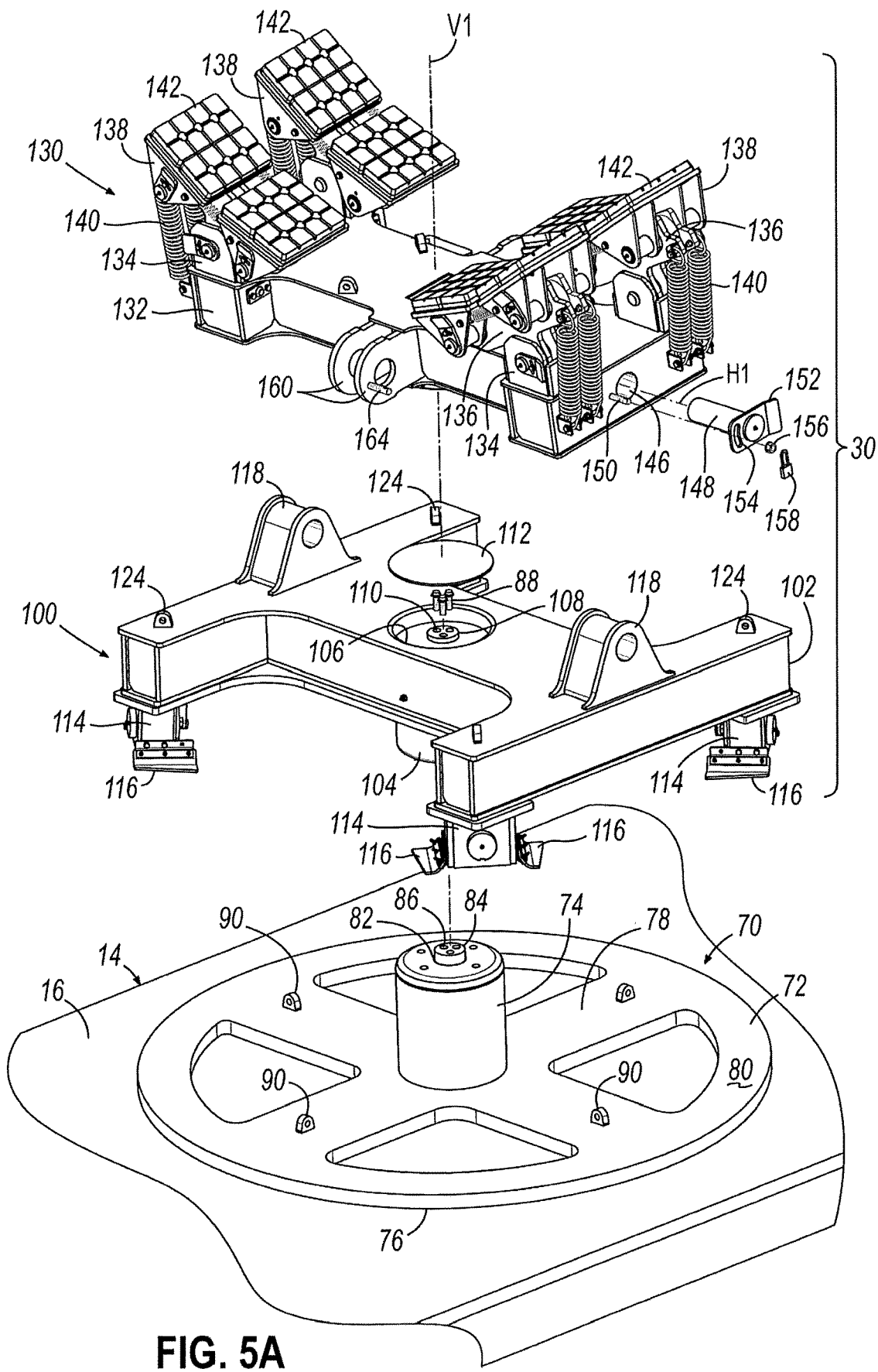
FIG. 5A is a partial disassembled front perspective view of the root bolster of FIG. 5, showing the lower turntable and upper cradle of the root bolster exploded from the root fixture.
Figure 5B:
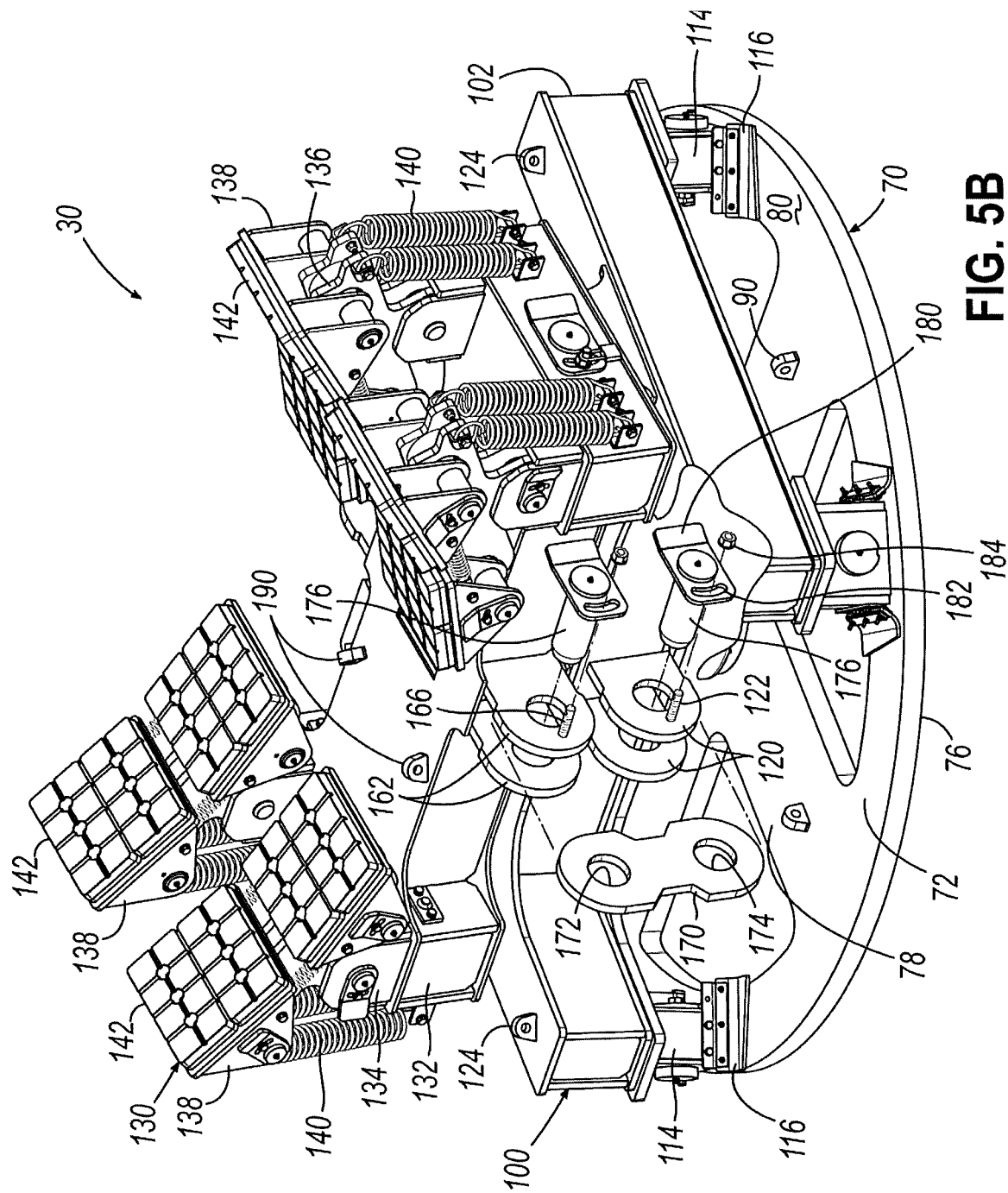
FIG. 5B is a partial disassembled rear perspective view of the root bolster of FIG. 5, showing the angle plate of the root bolster exploded from the lower turntable and upper cradle of the root bolster.
Figure 5C:
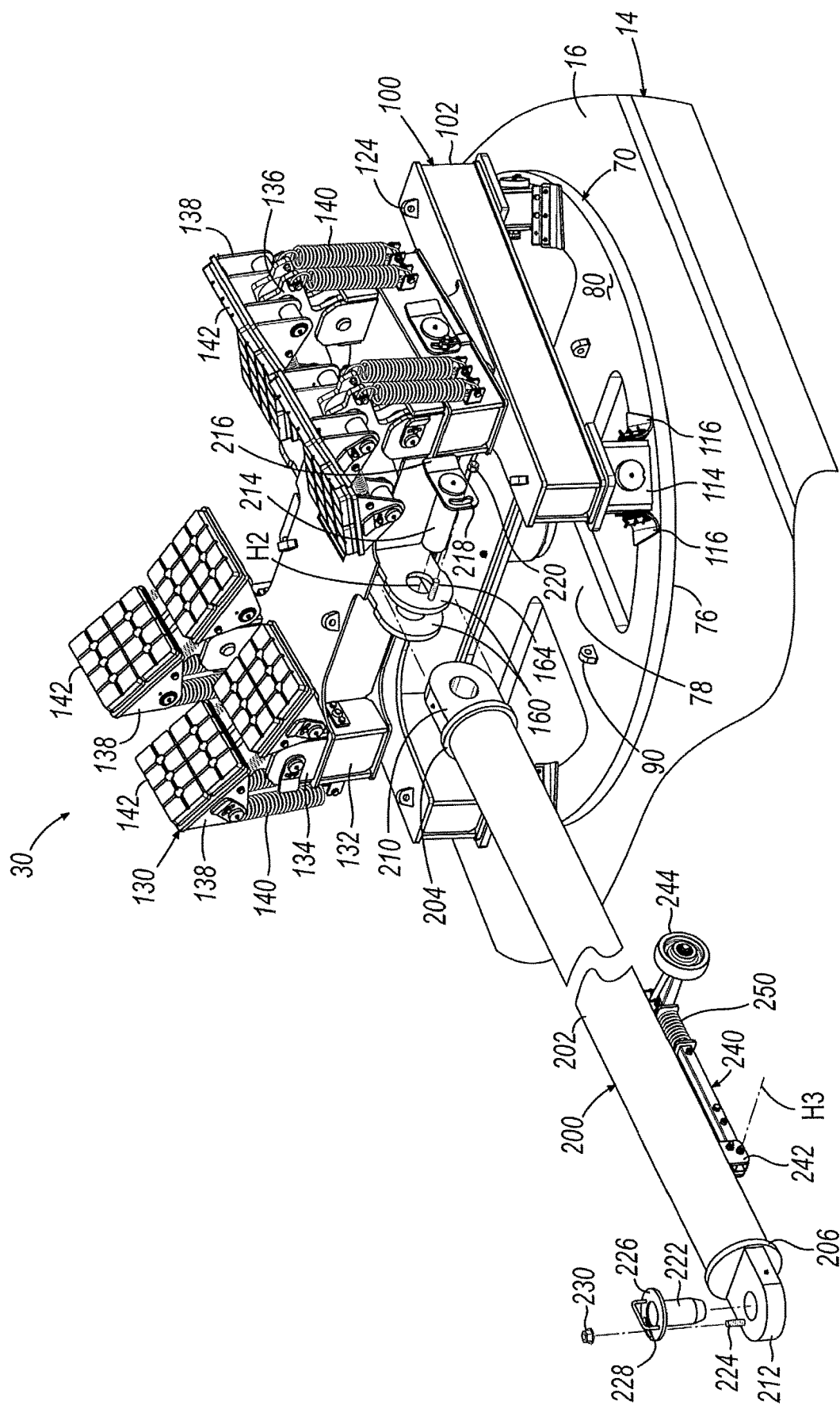
FIG. 5C is a partial disassembled front perspective view of the root bolster of FIG. 5, showing the rigid arm of the root bolster exploded from the upper cradle of the root bolster.

Referring now primarily to FIGS. 5-5C, the illustrated root bolster 30 is movably mounted to a root fixture 70 fixedly coupled to the bed 16 of the underlying railcar 14 against movement relative thereto. As best shown in FIG. 5A, the root fixture 70 includes a base plate 72 and a central shaft 74 extending generally upwardly from the base plate 72. The illustrated base plate 72 has a generally circular peripheral portion 76 and a generally X-shaped central portion 78 for providing rigidity to the base plate 72 and from which the central shaft 74 extends. In one embodiment, the root fixture 70 may be welded to the bed 16 of the railcar 14 along the edges of the X-shaped central portion 78 to fixedly couple the root fixture 70 to the bed 16 of the railcar 14. Alternatively, the root fixture 70 may be fixedly coupled to the bed 16 of the railcar 14 in any other suitable manner. In any event, the generally circular peripheral portion 76 defines an upper bearing surface 80, the purpose of which is described below. In the embodiment shown, the shaft 74 includes a central bore 82 for rotatably receiving a generally cylindrical spindle 84. As shown, the spindle 84 includes a plurality of threaded bores 86 for threadably receiving respective fasteners 88. The illustrated root fixture 70 also includes a plurality of hoist rings 90 positioned on an upper surface of the X-shaped central portion 78 and configured to facilitate hoisting of the root fixture 70 onto the bed 16 of the railcar 14 via a lifting arrangement (not shown), for example.

The illustrated root bolster 30 includes a lower turntable 100 configured to be mounted to the root fixture 70 and pivotable relative thereto about the first vertical axis V1. As best shown in FIG. 5A, the lower turntable 100 has a generally I-shaped frame 102 and a central sleeve 104 extending generally downwardly therefrom and configured to rotatably receive the shaft 74 of the root fixture 70 such that the shaft 74 and the sleeve 104 may collectively define the first vertical axis V1. In the embodiment shown, the lower turntable 100 includes a central recess 106 in the frame 102 generally above and axially aligned with the sleeve 104, and a raised boss 108 centered within the recess 106 and including a plurality of through-bores 110 configured for axial alignment with the threaded bores 86 of the rotatable spindle 84 of the root fixture 70 and for receiving the respective fasteners 88 therethrough to secure the lower turntable 100 to the rotatable spindle 84. As shown, a selectively removable cover 112 may be configured to enclose the recess 106 and conceal the fasteners 88 therein. In the embodiment shown, the lower turntable 100 also includes a plurality of peripheral feet 114 extending generally downwardly from the frame 102 and each having at least one lower bearing pad 116 configured to glide along the circular bearing surface 80 of the root fixture 70 during rotation of the lower turntable 100 relative thereto to assist in supporting the lower turntable 100 on the root fixture 70. The illustrated lower turntable 100 also includes a pair of oppositely disposed support heels 118 positioned on an upper surface of the frame 102, and a pair of lower eyelets 120 (FIG. 5B) positioned on a central side surface of the frame 102, the purposes of which are described below. In the embodiment shown, a threaded shank 122 extends outwardly from the outer side surface of at least one of the pair of lower eyelets 120. The illustrated lower turntable 100 further includes a plurality of hoist rings 124 positioned on an upper surface of the frame 102 and configured to facilitate hoisting of the lower turntable 100 onto the root fixture 70 via a lifting arrangement (not shown), for example.

Figure 7A:
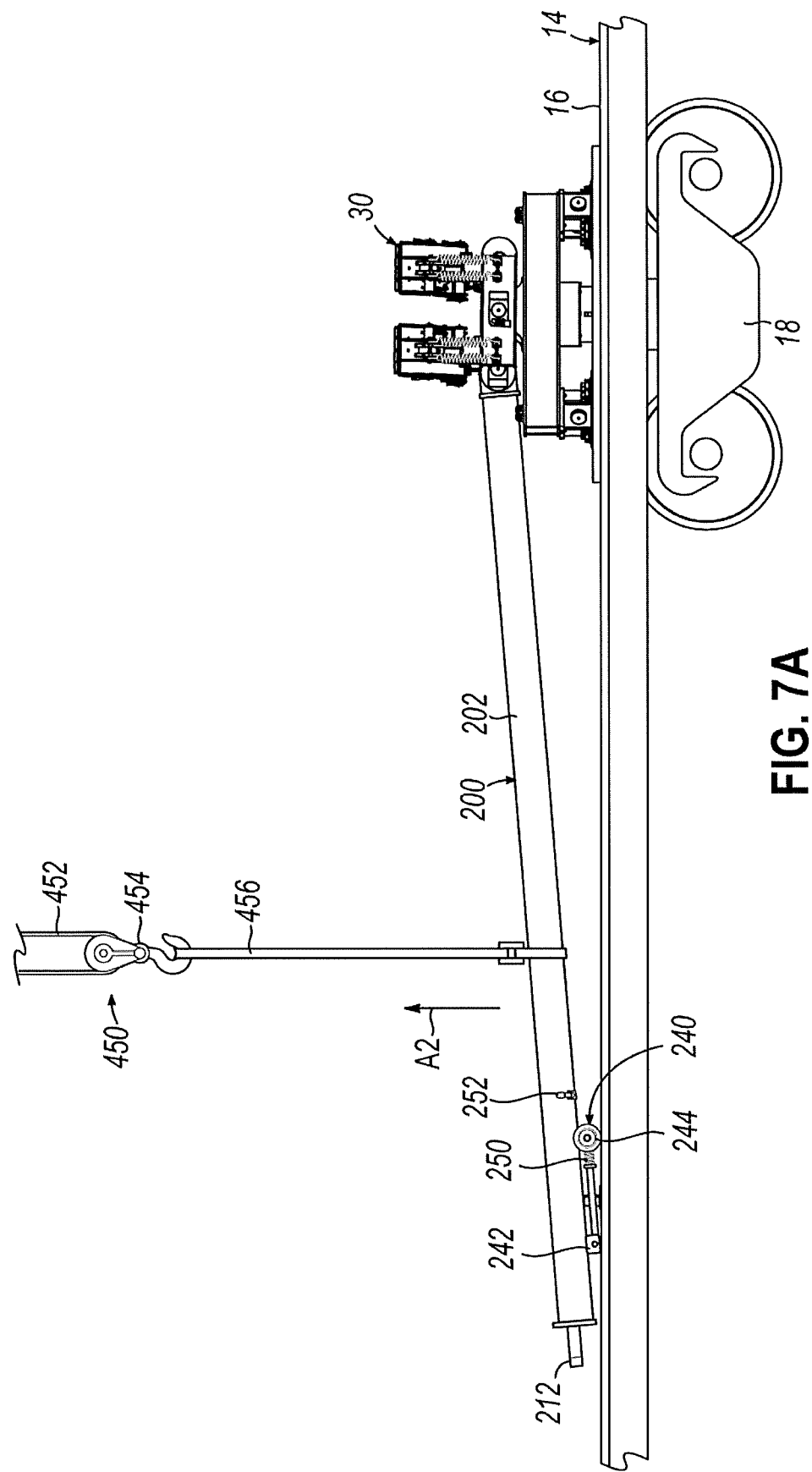
FIGS. 7A-7F are side elevation views of the root bolster illustrating a method of loading the wind turbine blade onto the root bolster.

In the embodiment shown, the root bolster 30 also includes an upper cradle 130 coupled to the lower turntable 100 and fixed against rotation relative to the lower turntable 100 about the first vertical axis V1 such that the upper cradle 130 and lower turntable 100 are configured to rotate thereabout together. In the embodiment shown, the upper cradle 130 has a generally I-shaped frame 132 and a plurality of peripheral pivot blocks 134 extending generally upwardly therefrom. As shown, each of the pivot blocks 134 pivotably supports a respective shackle 136, and each shackle 136 pivotably supports a pair of saddles 138 configured to confront the pressure side 50 or the suction side 52 of the blade 40 to be supported by the root bolster 30 at or near the leading edge 46 of the blade 40. In the embodiment shown, the upper cradle 130 also includes a plurality of springs 140 extending between the frame 132 and the shackles 136 for absorbing and damping shock impulses, for example. Each of the saddles 138 includes at least one friction pad 142 configured to frictionally engage the respective side 50, 52 of the blade 40. In this regard, the saddles 138 and/or friction pads 142 may be sized and shaped to conform to the exterior surface of the blade 40. In one embodiment, the friction pads 142 may include a rubber material. The pivotability of the saddles 138 relative to the shackles 136 and of the shackles 136 relative to the pivot blocks 134 may allow the saddles 138 to automatically adjust under the weight of the blade 40 to conform to the exterior surface thereof. In any event, one or more straps, such as webbing straps or cordlash 144 (FIG. 7F), may be configured to circumferentially wrap around the blade 40 and at least a portion of the upper cradle 130 and/or lower turntable 100 to secure the blade 40 against the saddles 138 and to counteract any vertical acceleration forces acting on the blade 40.

The illustrated upper cradle 130 includes a pair of oppositely disposed support bores 146 positioned on outer side surfaces of the frame 132 and configured for axial alignment with the support heels 118 of the lower turntable 100 and for receiving respective support pins 148 therethrough, such that the upper cradle 130 may be mounted to the lower turntable 100 via the support pins 148, support bores 146, and support heels 118. In the embodiment shown, a threaded shank 150 extends outwardly from the respective outer side surface of the frame 132 proximate each of the support bores 146, and each support pin 148 includes a flange 152 having a curved slot 154 configured to receive the respective threaded shank 150 for limiting relative movement between the frame 132 and the support pin 148. In this regard, a nut 156 may be configured for threadable engagement with each threaded shank 150 to sandwich the flange 152 of the respective support pin 148 between the nut 156 and the frame 132, and a padlock 158 may be inserted through a radial bore (not shown) at or near an outer end of the threaded shank 150 for preventing the nut from becoming inadvertently dislodged from the threaded shank 150.

In the embodiment shown, the upper cradle 130 also includes a first pair of upper eyelets 160 positioned on a central side surface of the frame 132 and a second pair of upper eyelets 162 (FIG. 5B) positioned on an opposite central side surface of the frame 132. A first threaded shank 164 extends outwardly from the outer side surface of at least one of the first pair of upper eyelets 160 and a second threaded shank 166 extends outwardly from the outer side surface of at least one of the second pair of upper eyelets 162.

As best shown in FIG. 5B, the second pair of upper eyelets 162 are configured for vertical alignment with the pair of lower eyelets 120 on the lower turntable 100. In this regard, an angle plate 170 having upper and lower bores 172, 174 may be selectively positioned between the pair of lower eyelets 120 and the second pair of upper eyelets 162 such that the upper and lower bores 172, 174 are axially aligned therewith for receiving respective locking pins 176 therethrough. In this manner, the orientation of the upper cradle 130 relative to the lower turntable 100 about a first horizontal axis H1 collectively defined by the support pins 148, support bores 146, and support heels 118, may be selectively and/or variably fixed. In one embodiment, a variety of angle plates 170 having upper and lower bores 172, 174 spaced apart from each other by various different distances may be provided, so that a particular angle plate 170 may be selected to provide a particular desired fixed orientation of the upper cradle 130 relative to the lower turntable 100. For example, a particular angle plate 170 may correspond to the desired fixed orientation of the upper cradle 130 relative to the lower turntable 100 for accommodating a particular shape or configuration of the blade 40. In the embodiment shown, each locking pin 176 includes an flange 180 having a curved slot 182 configured to receive the respective threaded shank 122, 166 for limiting relative movement between the respective frame 102, 132 and respective locking pin 176. In this regard, a nut 184 may be configured for threadable engagement with each threaded shank 122, 166 to sandwich the flange 180 of the respective locking pin 176 between the nut 184 and the respective eyelet 120, 162. The illustrated upper cradle 130 also includes a plurality of hoist rings 190 positioned on an upper surface of the frame 132 and configured to facilitate hoisting of the upper cradle 130 onto the lower turntable 100 via a lifting arrangement (not shown), for example.

As best shown in FIG. 5C, the illustrated root bolster 30 further includes a rigid arm 200 hingedly coupled to the upper cradle 130 about a second horizontal axis H2 and configured to extend from the upper cradle 130 toward the root end 42 of the blade 40 carried by the root bolster 30. The rigid arm 200 may be fixed against rotation relative to the lower turntable 100 and upper cradle 130 about the first vertical axis V1 such that the rigid arm 200, upper cradle 130, and lower turntable 100 may rotate thereabout together, and the rigid arm 200 may further be selectively fixed against rotation relative to the upper cradle 130 about the second horizontal axis H2.

As shown, the rigid arm 200 includes a generally cylindrical body 202 extending between a proximal end 204 coupled to the upper cradle 130 and a distal end 206 configured to be selectively rigidly coupled to the root end 42 of the blade 40. In one embodiment, the length of the body 202 of the rigid arm 200 may be equal to the first distance D1 between the root end 42 of the blade 40 to be supported by the root bolster 30 and the first vertical axis V1. Thus, the length of the body 202 may be approximately one-tenth of the length L of the blade 40. For example, the length of the body 200 may be between approximately 20 feet (approx. 6 m) and approximately 40 feet (approx. 12 m), such as approximately 23 feet (approx. 7 m).

In the embodiment shown, the rigid arm 200 includes a proximal eyelet 210 positioned at or near the proximal end 204 of the cylindrical body 202 and a distal eyelet 212 positioned at or near the distal end 206 of the cylindrical body 202. The proximal eyelet 210 is configured for axial alignment with the first pair of upper eyelets 160 of the upper cradle 130 and for receiving a pivot pin 214 therethrough, such that the pivot pin 214, proximal eyelet 210, and first pair of upper eyelets 160 may collectively define the second horizontal axis H2. In the embodiment shown, the pivot pin 214 includes a flange 216 having a curved slot 218 configured to receive the threaded shank 164 for limiting relative movement between the frame 132 and the pivot pin 214. In this regard, a nut 220 may be configured for threadable engagement with the threaded shank 164 to sandwich the flange 216 of the pivot pin 214 between the nut 220 and the eyelet 160.

In one embodiment, a lock (not shown) may selectively fix the rigid arm 200 against rotation relative to the upper cradle 130 about the second horizontal axis H2. As described in greater detail below, the distal eyelet 212 is configured to selectively receive a locking pin 222 for rigidly coupling the root end 42 of the blade 40 to the distal end 206 of the rigid arm 200. In the embodiment shown, a threaded shank 224 extends outwardly from an upper surface of the distal eyelet 212, and the locking pin 222 includes a flange 226 having a curved slot 228 configured to receive the threaded shank 224 for limiting relative movement between the body 202 of the rigid arm 200 and the locking pin 222. In this regard, a nut 230 may be configured for threadable engagement with the threaded shank 224 to sandwich the flange 226 of the locking pin 222 between the nut 230 and the distal eyelet 212.

Figure 7B:
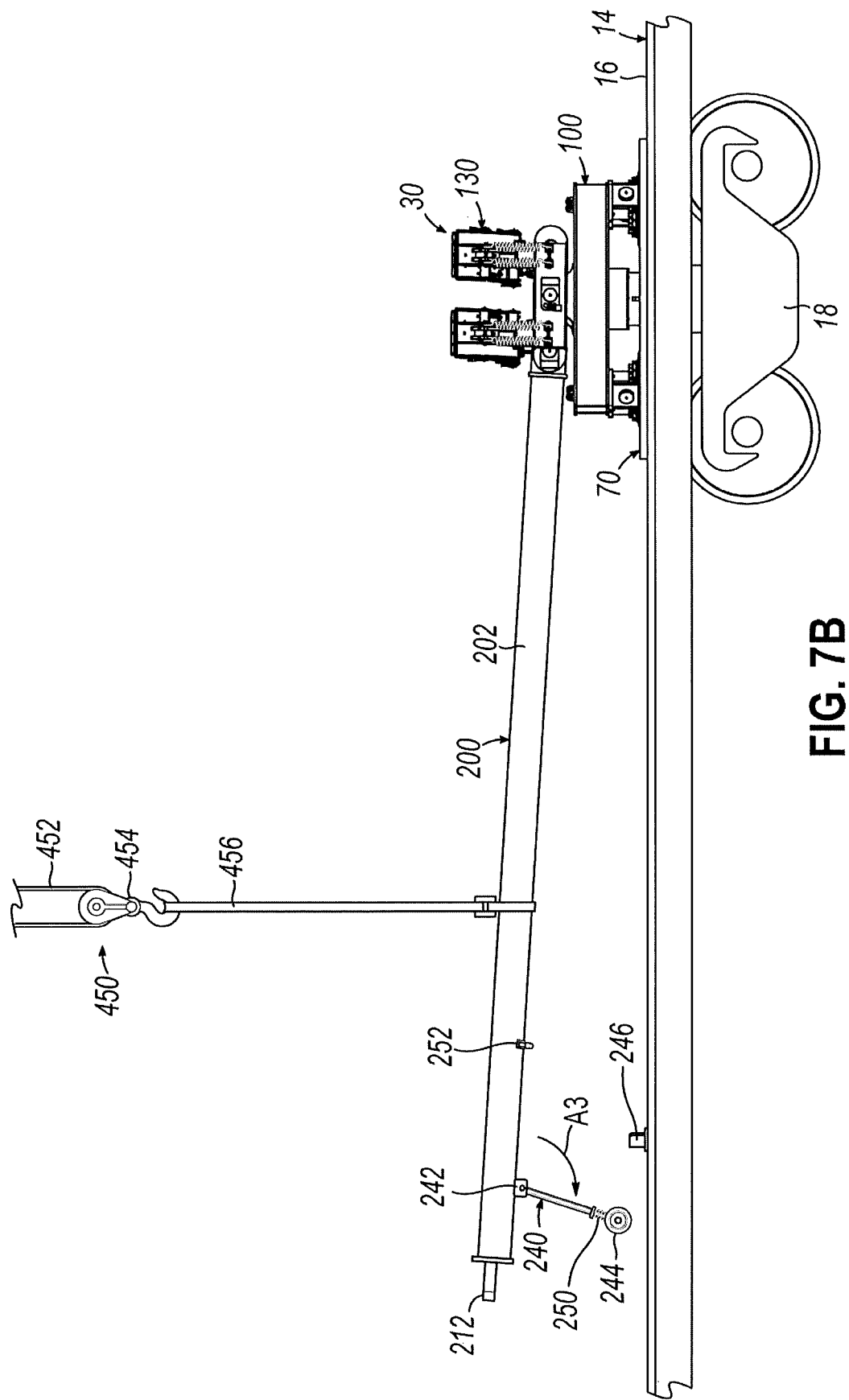
Figure 7C:
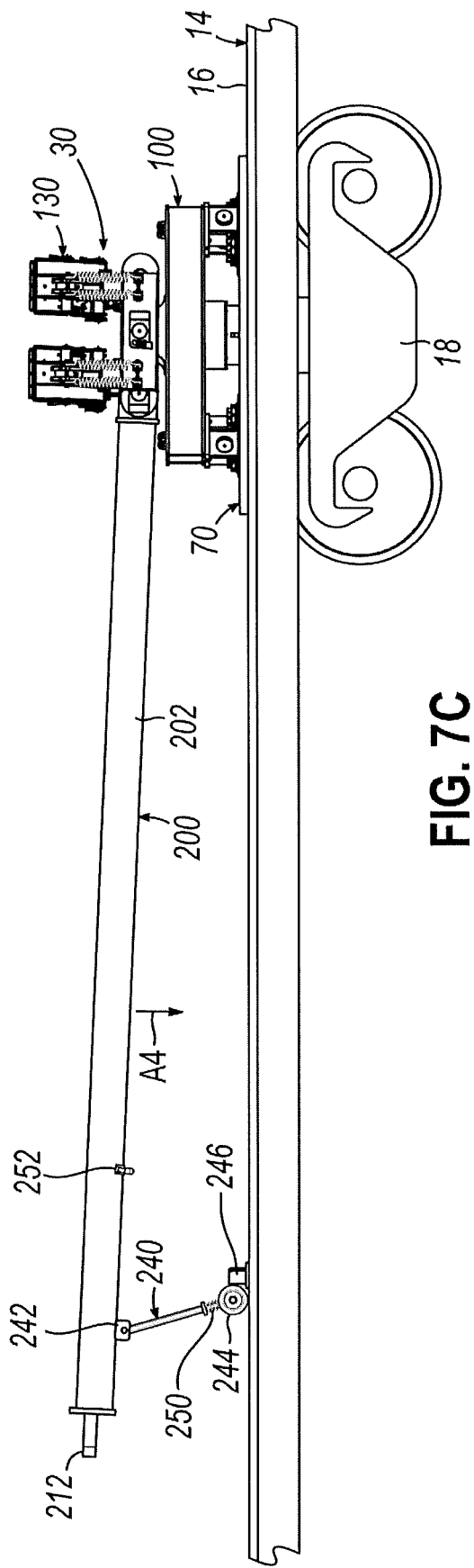

Thus, the rigid arm 200 may be selectively rotatable about the second horizontal axis H2, for example, between a stowed position (FIG. 7A) and at least one deployed position (FIGS. 7B and 7C). When in the stowed position, the body 202 of the rigid arm 200 may be oriented about second horizontal axis H2 to slope downwardly from the proximal end 204 at the upper cradle 130 toward the distal end 206 at or near the bed 16 of the railcar 14. For example, the distal end 206 of the rigid arm 200 may rest on or near the bed 16 of the railcar 14 when in the stowed position. When in the deployed position, the body 202 of the rigid arm 200 may be oriented about the second horizontal axis H2 to be generally horizontal, or to slope upwardly from the proximal end 204 toward the distal end 206, or to slope downwardly from the proximal end 204 toward the distal end 206 less steeply than when in the stowed position. For example, the distal end 206 of the rigid arm 200 may be slightly above, slightly below, or generally level with the proximal end 204 of the rigid arm 200, and may be supported above the bed 16 of the railcar 14, when in a deployed position. In one embodiment, the body 202 of the rigid arm 200 may be cantilevered over the bed 16 of the railcar 14 from the proximal end 204 of the rigid arm 200 by selectively fixing the rigid arm 200 against rotation relative to the upper cradle 130 about the second horizontal axis H2 when in a deployed position. In another embodiment, the body 202 of the rigid arm 200 may be supported above the bed 16 of the railcar 14 at or near both the proximal and distal ends 204, 206, such as via the upper cradle 130 at the proximal end 204 and via a temporary support structure positioned below the distal end 206, when in a deployed position.

In this regard, the illustrated root bolster 30 also includes an articulating leg 240 hingedly coupled to the body 202 of the rigid arm 200 at or near the distal end 206 thereof and, more particularly, at a joint 242 defining a third horizontal axis H3 such that the articulating leg 240 is rotatable relative to the rigid arm 200 about the third horizontal axis H3 between a retracted position (FIG. 7A) in which the articulating leg 240 is longitudinally aligned with and tucked against the rigid arm 200, and at least one extended position (FIGS. 7B and 7C) in which the articulating leg 240 extends generally downwardly from the rigid arm 200 toward the bed 16 of the railcar 14. The illustrated articulating leg 240 includes a pair of wheels 244 located opposite the joint 242 for movably supporting the articulating leg 240 on the bed 16 of the railcar 14. In the embodiment shown, a laterally-extending barrier 246 (FIG. 5) is provided on the bed 16 of the railcar 14 and is spaced apart from the root fixture 70 for selectively abutting the wheels 244 of the articulating leg 240 to assist in maintaining the articulating leg 240 in an extended position, as described in greater detail below. In one embodiment, the barrier 246 may be welded to the bed 16 of the railcar 14 to fixedly couple the barrier 246 to the bed 16 of the railcar 14. Alternatively, the barrier 246 may be fixedly coupled to the bed 16 of the railcar 14 in any other suitable manner. The illustrated articulating leg 240 also includes at least one spring 250 between the wheels 244 and the joint 242 for absorbing and damping shock impulses, for example.

While not shown, a locking mechanism may be configured to selectively lock the articulating leg 240 in at least the retracted position. For example, such a locking mechanism may include a pair of magnets, one of which is fixedly coupled to the articulating leg 240 at a position spaced apart from the joint 242 and the other of which is fixedly coupled to the body 202 of the rigid arm 200 for magnetic engagement therebetween when the articulating leg 240 is in or near the retracted position. The magnetic attraction between the magnets may be sufficient to securely retain the articulating leg 240 in the retracted position. In the embodiment shown, an on/off lever 252 (FIG. 7A) is configured to be movable between an "off" position in which the lever 252 causes a shield (not shown) to cover at least one of the magnets thereby interrupting the magnetic attraction between the magnets, and an "on" position in which the lever causes the shield to uncover the at least one of the magnets. Thus, the articulating leg 240 may be secured in the retracted position when the magnets are magnetically engaged with the lever 252 in the "on" position, and may be moved away from the retracted position toward the at least one extended position when the magnets are magnetically disengaged with the lever 252 in the "off" position. It will be appreciated that the locking mechanism may be configured in any other suitable manner for selectively locking the articulating leg 240 in at least the retracted position.

In one embodiment, the distal end 206 of the rigid arm 200 is configured to be rigidly coupled to the root end 42 of the blade 40 when the rigid arm 200 is in the deployed position. For example, the distal end 206 of the rigid arm 200 may be configured to be initially rigidly coupled to the root end 42 of the blade 40 when the rigid arm 200 is in the deployed position and when the distal end 206 of the rigid arm 200 is supported above the bed 16 of the railcar 14 by the extended articulating leg 240, and may be configured to remain rigidly coupled to the root end 42 of the blade 40 when the articulating leg 240 is subsequently moved to the retracted position, as described in greater detail below.

In this manner, the rigid arm 200 may be capable of providing a linkage between the root end 42 of the blade 40 and the upper cradle 130 of the root bolster 30 and may thereby assist in transmitting longitudinal acceleration and/or deceleration forces between the root end 42 of the blade 40 and the root fixture 70. By rotating about the first vertical axis V1 along with the upper cradle 130 and lower turntable 100 of the root bolster 30, the rigid arm 200 may remain longitudinally aligned with the blade 40 and may assist in allowing the root end 42 of the blade 40 to swing out over and beyond the edge of the railcar 14, such as while rounding a curved section of the railroad. In this regard, the blade 40 may be rested on the saddles 138 of the root bolster 30 at a position inboard of the root end 42 by approximately the same length as the length of the rigid arm 200, and may be rigidly coupled to the distal end 206 of the rigid arm 200 at the root end 42, as described in greater detail below.

Figure 6:
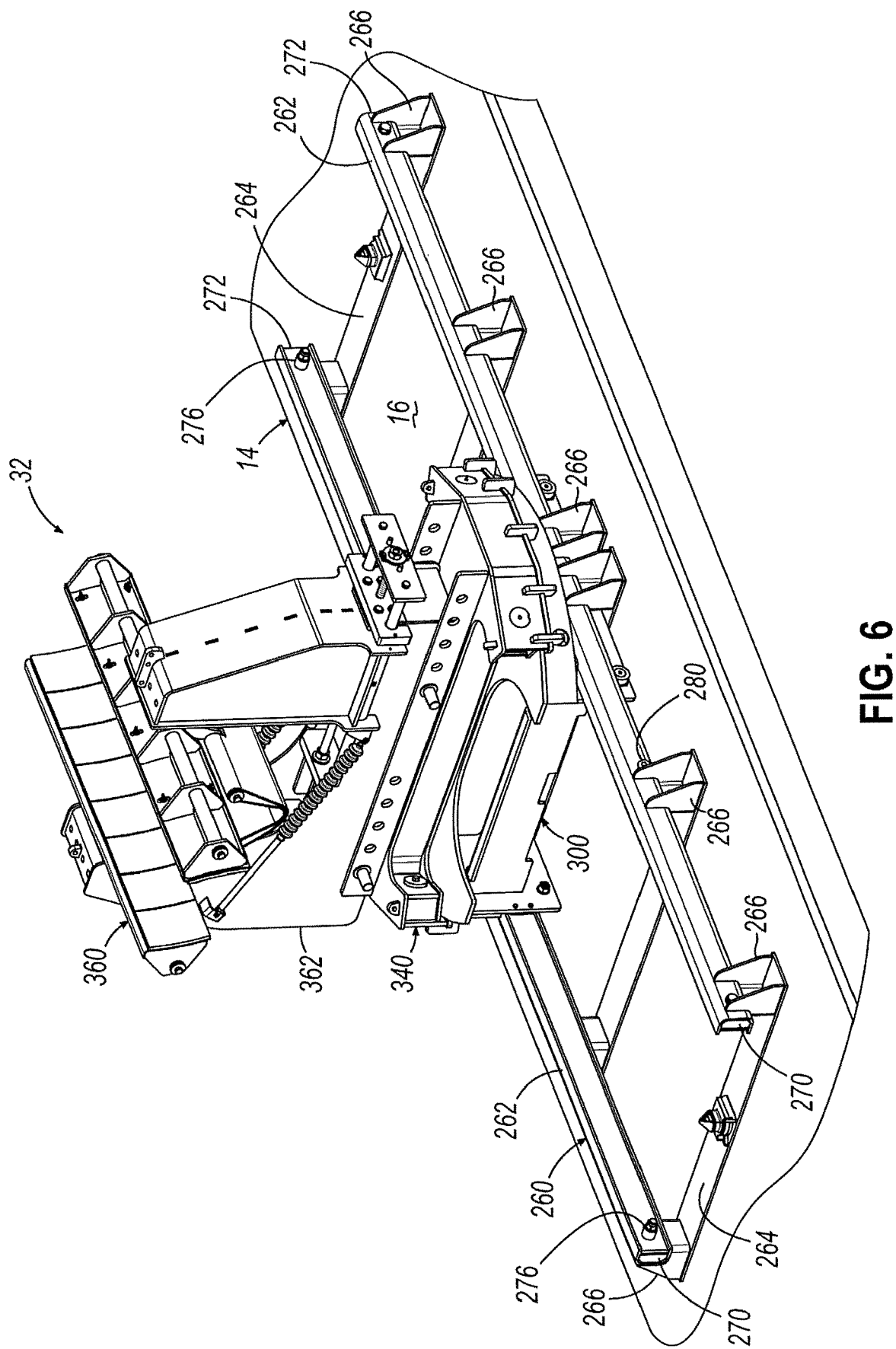
FIG. 6 is a front perspective view of the tip bolster of FIG. 1 pivotably mounted to a tip fixture fixed to the bed of the respective railcar.
Figure 6A:
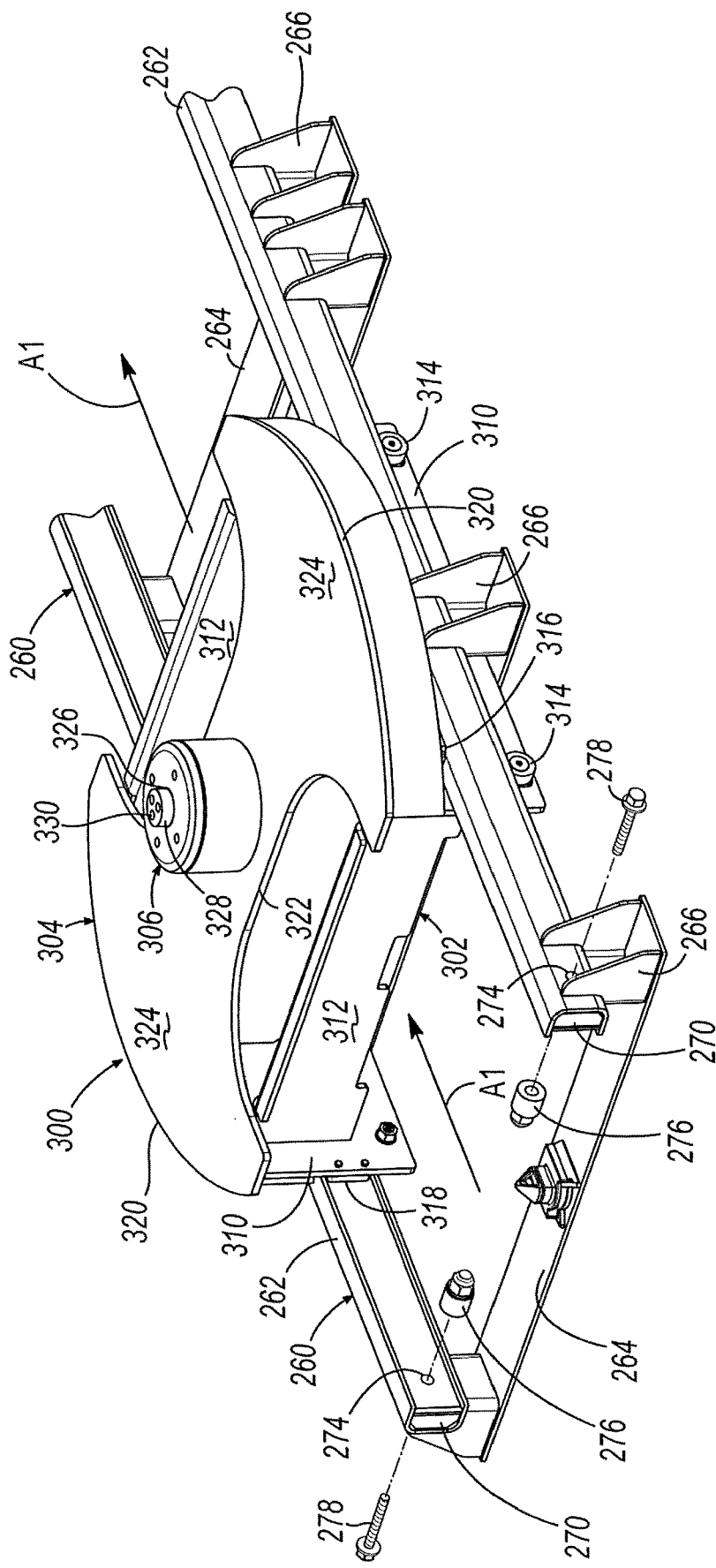
FIG. 6A is a partial disassembled front perspective view of the tip bolster of FIG. 6, showing the lower carriage of the root bolster being translatably mounted to the rails of the tip fixture.
Figure 6B:
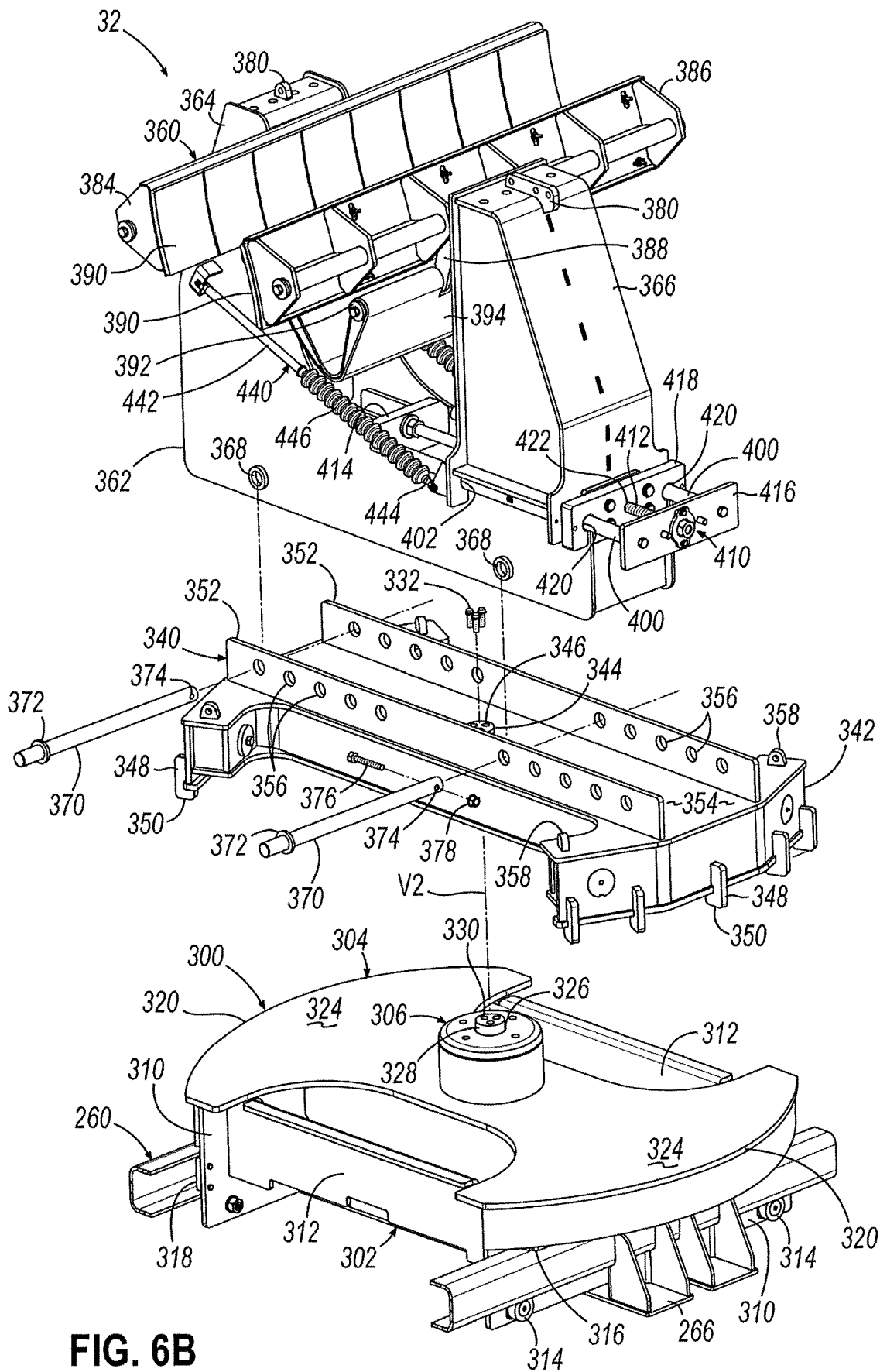
FIG. 6B is a partial disassembled front perspective view of the tip bolster of FIG. 6, showing the intermediate turntable and upper clamp of the tip bolster exploded from the lower carriage of the tip bolster.

Referring now primarily to FIGS. 6-6B, the illustrated tip bolster 32 is movably mounted to a tip fixture 260 fixedly coupled to the bed 16 of the underlying railcar 14 against movement relative thereto. As shown, the tip fixture 260 includes a pair of longitudinally extending rails 262 spaced apart from and rigidly coupled to each other by a plurality of laterally extending ties 264 and corresponding brackets 266. In the embodiment shown, the rails 262 each extend along the bed 16 of the railcar 14 between first and second ends 270, 272, and are elevated above the bed 16 of the railcar 14 by the brackets 266. As shown in FIG. 6A, a through-bore 274 is positioned at or near each of the ends 270, 272 of the rails 262 and a laterally-inwardly extending stopper 276 is aligned therewith and removably coupled to the respective rail 262 via a corresponding fastener 278 extending therethrough for limiting translational movement of the tip bolster 32 along the rails 262, as described in greater detail below. In one embodiment, the tip fixture 260 may be welded to the bed 16 of the railcar 14 along the edges of the ties 264 to fixedly couple the tip fixture 260 to the bed 16 of the railcar 14. Alternatively, the tip fixture 260 may be fixedly coupled to the bed 16 of the railcar 14 in any other suitable manner. The illustrated tip fixture 260 also includes a plurality of hoist grommets 280 (FIG. 6) positioned on outer side surfaces of the rails 262 and configured to facilitate hoisting of the tip fixture 260 onto the bed 16 of the railcar 14 via a lifting arrangement (not shown), for example.

As best shown in FIGS. 6A and 6B, the illustrated tip bolster 32 includes a lower carriage 300 configured to be mounted to the tip fixture 260 and longitudinally translatable relative thereto along the rails 262. In the embodiment shown, the lower carriage 300 includes a chassis 302 carrying a platform 304, and a central shaft 306 extending generally upwardly from the platform 304. As shown, the chassis 302 has a pair of longitudinally extending sidewalls 310 spaced apart from and rigidly coupled to each other by a pair of laterally extending cross supports 312. Each of the sidewalls 310 includes a pair of laterally-outwardly extending lower rollers 314 and a corresponding pair of laterally-outwardly extending upper sliders 316 vertically aligned therewith, such that each set of vertically-aligned rollers 314 and sliders 316 may be configured to capture a respective one of the rails 262 therebetween for translatably securing the lower carriage 300, and thus the tip bolster 32, to the tip fixture 260. In the embodiment shown, a laterally-outwardly extending bumper 318 is positioned between each set of vertically-aligned rollers 314 and sliders 316 and is configured to selectively abut the respective stopper 276 of the corresponding rail 262 to limit translational movement of the tip bolster 32 along the rails 262 between the first and second ends 270, 272 thereof and thereby prevent the tip bolster 32 from becoming inadvertently dislodged from the tip fixture 260. The stoppers 276 may be selectively removable from the respective rails 262 for allowing initial mounting of the lower carriage 300 to the tip fixture 260, as indicated by the arrows A1 in FIG. 6A, or subsequent dismounting of the lower carriage 300 from the tip fixture 260.

In the embodiment shown, the platform 304 has a pair of lateral generally circular arc-shaped peripheral portions 320 and a generally I-shaped central portion 322 for providing rigidity to the platform 304 and from which the central shaft 306 extends. The generally circular arc-shaped peripheral portions 320 define respective upper bearing surfaces 324, the purpose of which is described below. In the embodiment shown, the shaft 306 includes a central bore 326 for rotatably receiving a generally cylindrical spindle 328. As shown, the spindle 328 includes a plurality of threaded bores 330 for threadably receiving respective fasteners 332 (FIG. 6B). The lower carriage 300 may also include a plurality of hoist rings (not shown) positioned on the outer side surfaces of the generally arc-shaped peripheral portions 320 and configured to facilitate hoisting of the lower carriage 300 onto the tip fixture 260 via a lifting arrangement (not shown), for example.

The illustrated tip bolster 32 also includes an intermediate turntable 340 pivotably coupled to the lower carriage 300 about the second vertical axis V2 and fixed against linear movement relative to the lower carriage 300, such that the intermediate turntable 340 and lower carriage 300 are configured to translate along the rails 262 together. In the embodiment shown, the intermediate turntable 340 has a generally I-shaped frame 342 and may include a central bore (not shown) on a lower side thereof configured to rotatably receive the shaft 306 of the lower carriage 300 such that the bore and the shaft 306 may collectively define the second vertical axis V2. As best shown in FIG. 6B, the intermediate turntable 340 includes a central raised boss 344 extending upwardly from the frame 342 and including a plurality of through-bores 346 configured for axial alignment with the threaded bores 330 of the rotatable spindle 328 of the lower carriage 300 and for receiving the respective fasteners 332 therethrough to secure the intermediate turntable 340 to the rotatable spindle 328. In the embodiment shown, the intermediate turntable 340 also includes a plurality of peripheral feet 348 extending generally downwardly from the frame 342 and each having a lower bearing surface 350 configured to glide along the respective circular arc-shaped bearing surface 324 of the lower carriage 300 during rotation of the intermediate turntable 340 relative thereto to assist in supporting the intermediate turntable 340 on the lower carriage 300. The illustrated intermediate turntable 340 also includes a pair of flanges 352 extending generally upwardly from the frame 342 and spaced apart from each other to define a channel 354 therebetween. As shown, each flange 352 includes a plurality of holes 356 arranged such that each hole 356 in one of the flanges 352 is axially aligned with a corresponding hole 356 in the other of the flanges 352. The illustrated intermediate turntable 340 also includes a plurality of hoist rings 358 positioned on an upper surface of the frame 342 and configured to facilitate hoisting of the intermediate turntable 340 onto the lower carriage 300 via a lifting arrangement (not shown), for example.

In the embodiment shown, the tip bolster 32 also includes an upper clamp 360 selectively fixed against movement relative to the intermediate turntable 340 such that the upper clamp 360 and intermediate turntable 340 are configured to rotate together about the second vertical axis V2, and such that the upper clamp 360, intermediate turntable 340, and lower carriage 300 are configured to translate together along the rails 262. As shown, the upper clamp 360 includes a clamp frame 362, as well as first and second clamp arms 364, 366 selectively movable relative to each other in a clamping direction. In the embodiment shown, the first clamp arm 364 is configured to be stationary relative to the clamp frame 362, and the second clamp arm 366 is configured to be movable relative to the clamp frame 362 toward and away from the first clamp arm 364 in the clamping direction. In this regard, the illustrated first clamp arm 364 is integrally formed together with the clamp frame 362 as a unitary piece. The illustrated clamp frame 362 is sized and configured to be partially received within the channel 354 of the intermediate turntable 340, and includes a pair of lower bores 368 configured for axial alignment with a selected set of holes 356 in the flanges 352 of the intermediate turntable 340 and for receiving respective locking rods 370 therethrough. In this manner, the position of the clamp frame 362 relative to the intermediate turntable 340 may be selectively fixed. The various sets of holes 356 in the flanges 352 available for alignment with the lower bores 368 of the clamp frame 362 may allow the particular position of the clamp frame 362 within the channel 354 to be adjusted as desired. In the embodiment shown, each locking rod 370 includes a flange 372 at or near one end thereof and a radial bore 374 for receiving a threaded fastener 376 at or near the other end thereof, the threaded fastener 376 being configured to threadably engage a nut 378 for selectively capturing the flanges 352 of the intermediate turntable 340 between the flange 372 of the locking rod 370 and the fastener 376 and accompanying nut 378. The illustrated upper clamp 360 also includes a plurality of hoist rings 380 positioned on upper surfaces of the clamp arms 364, 366 and configured to facilitate hoisting of the upper clamp 360 onto the intermediate turntable 340 via a lifting arrangement (not shown), for example.

The illustrated upper clamp 360 has upper pivot blocks 382 (FIG. 8A) extending generally inwardly from each of the clamp arms 364, 366. As shown, each of the pivot blocks 382 pivotably supports at least one respective jaw 384, 386 configured to confront the pressure side 50 or the suction side 52 of the blade 40 at or near the leading edge 46 of the blade 40, and further pivotably supports at least one respective saddle arm 388. Since the first clamp arm 364 is configured to be stationary relative to the clamp frame 362 and the second clamp arm 366 is configured to be movable relative to the clamp frame 362, the jaw 384 of the first clamp arm 364 may be considered "stationary" and the jaw 386 of the second clamp arm 366 may be considered "movable". In any event, each of the jaws 384, 386 includes at least one friction pad 390 configured to frictionally engage the respective side 50, 52 of the blade 40. In this regard, the jaws 384, 386 and/or friction pads 390 may be sized and shaped to conform to the exterior surface of the blade 40. In one embodiment, the friction pads 390 may include a rubber material. In the embodiment shown, each of the saddle arms 388 carries a respective saddle bar 392, and a pliable saddle 394 configured to confront the leading edge 46 of the blade 40 extends loosely between the saddle bars 392 of the first and second clamp arms 364, 366. In this regard, the pliable saddle 394 may be configured as an endless loop of material wrapped about the saddle bars 392. In one embodiment, each saddle arm 388 and accompanying saddle bar 392 may be rigidly coupled to the respective jaw 384, 386 so as to pivot relative to the corresponding clamp arm 364, 366 therewith. In this manner, the pliable saddle 394 may be configured to allow the blade 40 to rotate slightly about the longitudinal axis of the blade 40 to mechanical equilibrium (which may include leaning against one of the jaws 384, 386, for example) as the weight of the blade 40 is transferred to the pliable saddle 394 during lowering of the blade 40 onto the tip bolster 32, and may further be configured to tilt one or both of the jaws 384, 386 toward the exterior surface of the blade 40 during such lowering of the blade 40. Thus, the pliable saddle 394 may provide some flexibility to the positioning of the blade 40 between the jaws 384, 386. The pivotability of the jaws 384, 386 relative to the pivot blocks 382 and the pliability of the saddle 394 may allow the jaws 384, 386 and/or saddle 394 to automatically adjust under the weight of the blade 40 to conform to the exterior surface thereof.

In the embodiment shown, the upper clamp 360 further includes a pair of peripheral guide rods 400 extending parallel to the clamping direction and fixedly coupled to the clamp frame 362 against movement relative thereto. The second clamp arm 366 includes two corresponding pairs of lower notches 402 configured to slidably receive the pair of guide rods 400 such that the second clamp arm 366 may be movable toward (e.g., forward) and away from (e.g., backward) the first clamp arm 364 along the pair of guide rods 400 for moving the movable jaw 386 toward and away from the stationary jaw 384 to apply and release a clamping force to/from the blade 40 interposed therebetween and resting on the saddle 394. For example, the movable jaw 386 may be moved into contact with the blade 40 to press the blade 40 against the stationary jaw 384 for generating such a clamping force.

The illustrated upper clamp 360 also includes an actuator 410 configured to effect forward and backward movement of the second clamp arm 366 along the pair of guide rods 400. As shown, the actuator 410 includes a rotatable drive screw 412 extending parallel to the clamping direction, horizontally aligned with and equally spaced between the pair of guide rods 400, and fixed against movement relative to the clamp frame 362 parallel to the clamping direction. In this regard, the drive screw 412 is rotatably supported by a first end plate 414 fixedly coupled directly to the clamp frame 362 generally between the first and second clamp arms 364, 366, and by a second end plate 416 fixedly coupled to the clamp frame 362 via the pair of guide rods 400 on a side of the second clamp arm 366 generally opposite from the first clamp arm 364. The actuator 410 further includes a drive plate 418 having a pair of outer through-bores 420 configured to slidably receive the pair of guide rods 400 such that the drive plate 418 may be movable along the pair of guide rods 400. As shown, the drive plate 418 also includes a central threaded bore 422 configured to threadably receive the drive screw 412, such that rotation of the drive screw 412 may effect forward or backward movement of the drive plate 418 along the guide rods 400. For example, clockwise rotation of the drive screw 412 may effect forward movement of the drive plate 418 along the guide rods 400 to urge the second clamp arm 366 forward for applying a clamping force to the blade 40 via the jaws 384, 386, while counter-clockwise rotation of the drive screw 412 may effect backward movement of the drive plate 418 along the guide rods 400 to allow the second clamp arm 366 to be moved backward for releasing the blade 40 from the jaws 384, 386. The drive plate 418 may be selectively fixed at a particular location along the guide rods 400 when the drive screw 412 is rotationally stationary, such as when a desired clamping force on the blade 40 has been achieved, as described in greater detail below. In one embodiment, the drive screw 412 may be operatively coupled to a motor (not shown) for automatically rotating the drive screw 412 in the clockwise and/or counterclockwise direction.

In the embodiment shown, the actuator 410 further includes a mechanical energy storage device shown here in the form of a pair of coil springs 430 (FIGS. 8A and 9A) although other devices may be contemplated, such as leaf springs or belleville springs or piston type devices. These may be positioned between the drive plate 418 and the second clamp arm 366 and configured to selectively store and release energy between the drive plate 418 and the second clamp arm 366, thereby providing some flexibility to the actuator 410. In the illustrated example, coil springs 430 are shown arranged about the pair of guide rods 400. This mechanical energy storage device allows the clamp 360 to respond to unexpected decreases in the clamping force being applied to the blade 40. In this regard, the illustrated springs 430 are each configured to transmit the forward linear movement of the drive plate 418 along the guide rods 400 to the second clamp arm 366 for urging the second clamp arm 366 forward until the movable jaw 386 presses the blade 40 against the stationary jaw 384 and further forward movement of the second clamp arm 366 is generally resisted by the blade 40. The springs 430 are each further configured to be compressed or "pre-loaded" by the drive plate 418 as the drive plate 418 continues to move forward along the guide rods 400 after the movable jaw 386 presses the blade 40 against the stationary jaw 384. In this manner, the mechanical energy storage device (e.g. springs 430) may assist in preventing such continued forward movement of the drive plate 418 from further urging the second clamp arm 366 forward which could otherwise result in an excessive, potentially damaging clamping force being applied to the blade 40. Moreover, the mechanical energy storage device—e.g. comprising or including compressed or pre-loaded springs 430—may be capable of expanding in response to an unexpected positional shift of the blade, causing a decrease or loss of contact between the movable jaw 386 and the blade 40. Such a decrease or loss of contact may in particular be characterised as a momentary decrease in the clamping force. A decrease in the clamping force may in particular arise as a result of a shift in position of the clamped element, i.e. a shift in position of the blade 40, perhaps as a result of a large jolt during transportation. In response to such a jolt, a blade 40 may slightly shift its position, and may thereafter present a narrower profile between the clamp jaws 384, 386. In the present specification, a decrease in the clamping force may be alternatively be understood or expressed as a shift in position of the clamped blade. Expansion of the springs 430 under these circumstances may urge the second clamp arm 366 further forward to cause the movable jaw 386 to advance toward the stationary jaw 384 and thereby increase the contact and/or the clamping force applied to the blade 40. In this manner, the springs 430 may automatically compensate for undesirable decreases or losses of contact between the jaws 384, 386 and the blade 40, which may be indicative of the blade 40 creeping, drifting, or otherwise beginning to slip. The mechanical energy storage device ensures that the clamping force applied to the blade 40 between the jaws 384, 386, e.g. during initial securement of the blade 40 in the tip bolster 32 or during an initial stage of a transport operation, is maintained substantially constant, even after a shift in position of the blade 40. This ensures that a decrease or loss of contact between the movable jaw 386 and the blade 40 is only momentary and therefore benign. Thus, the springs 430 may assist in maintaining a substantially continuous desired clamping force on the blade 40.

In one embodiment, the drive screw 412 may be configured to effect forward linear movement of the drive plate 418 until a desired amount of clamping force is applied by the jaws 384, 386 to the blade 40, and/or until a desired amount of compression or pre-loading of the springs 430 has been achieved. In this regard, the amount of compression of the springs 430 and the amount of clamping force applied to the blade 40 each correspond to the distance between the drive plate 418 and the second clamp arm 366. Thus, the drive screw 412 may be configured to position the drive plate 418 at a particular location along the guide rods 400 corresponding to the desired amount of clamping force and/or pre-loading. In one embodiment, the guide rods 400 may include indicia (not shown) for providing a visual indication of such a particular location to an operator of the tip bolster 32 or other personnel.

While the energy storage devices of this embodiment are illustrated as a pair of coil springs 430, any other suitable energy storage devices, such as one or more hydraulic accumulators, may be used to selectively store and release energy between the drive plate 418 and the second clamp arm 366 in response to the applied clamping force falling below the desired amount.

In the embodiment shown, the upper clamp 360 further includes a pair of spring-loaded separators 440 extending between the first and second clamp arms 364, 366 for biasing the second clamp arm 366 away from the first clamp arm 364 in the clamping direction. Each of the illustrated spring-loaded separators 440 is telescopic and includes at least one outer tuber 442 and at least one inner tube 444 biased axially away from each other by an internal biasing member, such as a coil spring or a hydraulic accumulator (not shown), for example, as well as a protective gasket 446 positioned about the interface between the outer and inner tubes 442, 444 for preventing dirt or other debris from collecting therebetween. The spring-loaded separators 440 may be configured to urge the second clamp arm 366 backward for releasing the blade 40 from the jaws 384, 386, such as when the drive screw 412 is rotated to move the drive plate 418 backward along the guide rods 400 allowing the springs 430 to expand in a backward direction and thereby remove any force applied to the second clamp arm 366 by the springs 430. In this manner, the spring-loaded separators 440 may automatically cause the blade 40 to be released from the jaws 384, 386 when the force applied to the second clamp arm 366 by the springs 430 is removed by retracting the drive plate 418 backward along the guide rods 400, without requiring intervention of an operator or other personnel to push the second clamp arm 366 backward.

Thus, the upper clamp 360 may be capable of applying a substantially continuous clamping force to the blade 40 and may thereby assist in transmitting longitudinal acceleration and/or deceleration forces between the tip region 64 of the blade 40 and the tip fixture 260, as well as counteracting any vertical acceleration forces acting on the blade 40. By being longitudinally translatable along the rails 262, the lower carriage 300 may compensate for changes in the profile of the train 12, such as while rounding a curved section of the railroad.

Referring now to FIGS. 7A-7F, a method of loading the blade 40 onto the root bolster 30 is provided. Initially, the rigid arm 200 of the root bolster 30 may be resting on or near the bed 16 of the railcar 14 in the stowed position, and the articulating leg 240 may be in the retracted position. A first lifting arrangement 450 including a hoist rope 452, a hook 454, and a sling 456 may be operatively attached to the body 202 of the rigid arm 200, and the rigid arm 200 may thereby be lifted upwardly and rotated about the second horizontal axis H2, for example, from the stowed position to a deployed position, as indicated by the arrow A2 in FIG. 7A. After the rigid arm 200 has been lifted away from the stowed position, the locking mechanism for the articulating leg 240 may be disengaged, such as by moving the lever 252 to the "off" position, and the articulating leg 240 may be rotated about the third horizontal axis H3 from the retracted position toward an extended position, as indicated by the arrow A3 in FIG. 7B. The distal end 206 of the rigid arm 200 may then be lowered downwardly toward the bed 16 of the railcar 14 by the first lifting arrangement 450, as indicated by the arrow A4 in FIG. 7C, to allow the wheels 244 of the articulating leg 240 to rest on the bed 16 of the railcar 14. The first lifting arrangement 450 may then be removed from the rigid arm 200. As shown in FIG. 7C, the wheels 244 of the articulating leg 240 may be rolled into abutment with the barrier 246 on the bed 16 of the railcar 14 on a side of the barrier 246 opposite from the root fixture 70 to temporarily secure the rigid arm 200 in the illustrated deployed position.

Figure 7D:
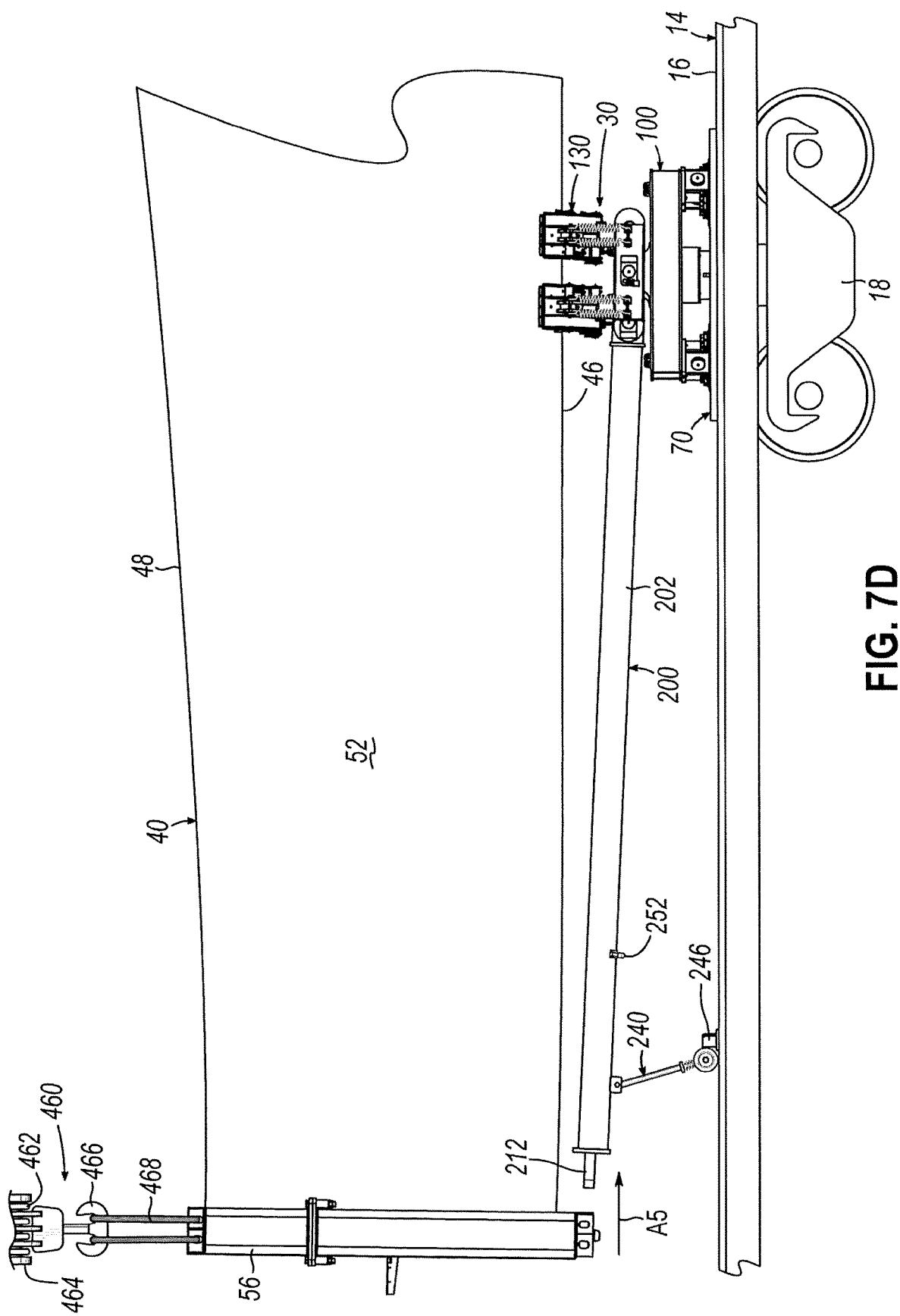
Figure 7E:
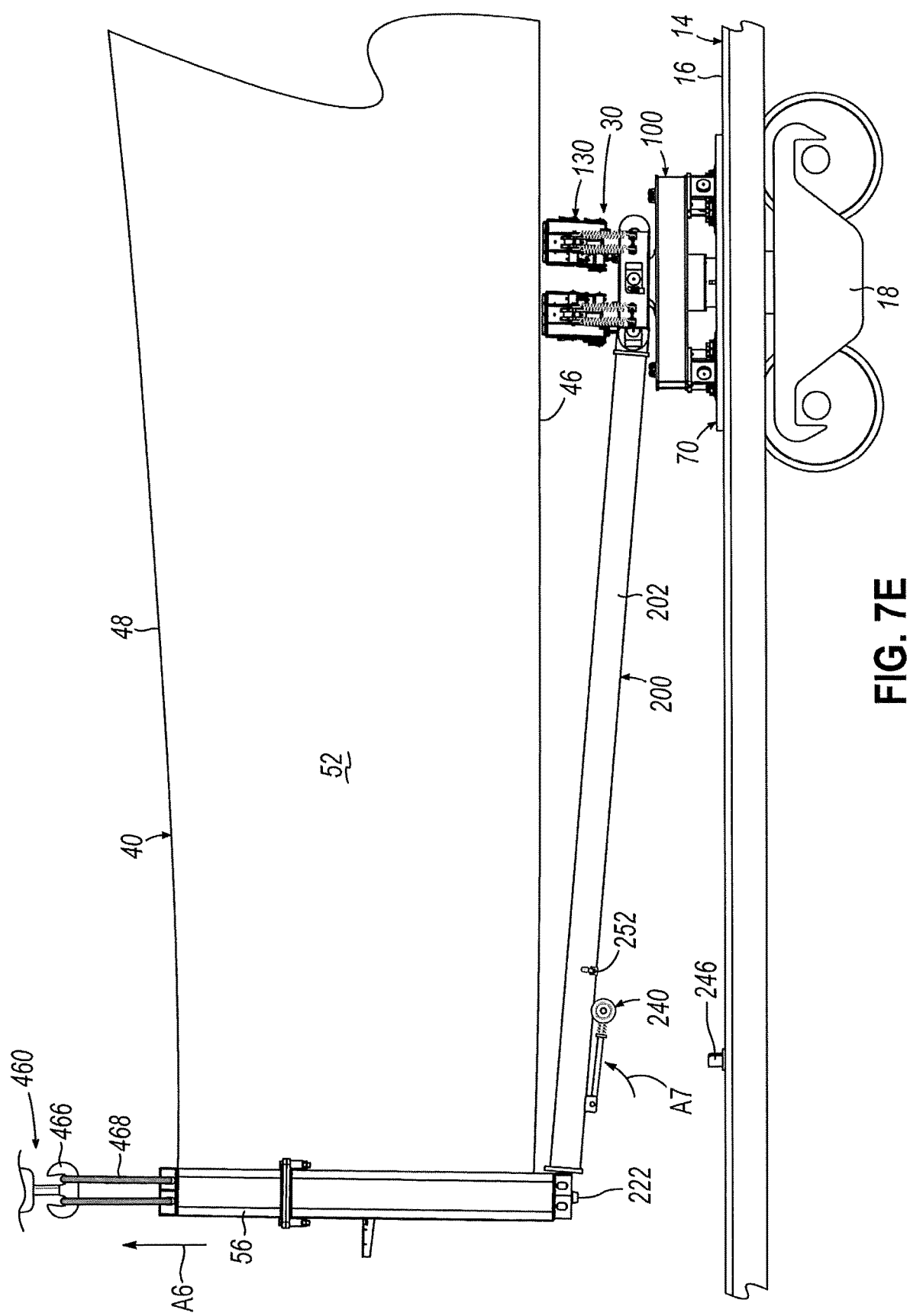
Figure 7F:
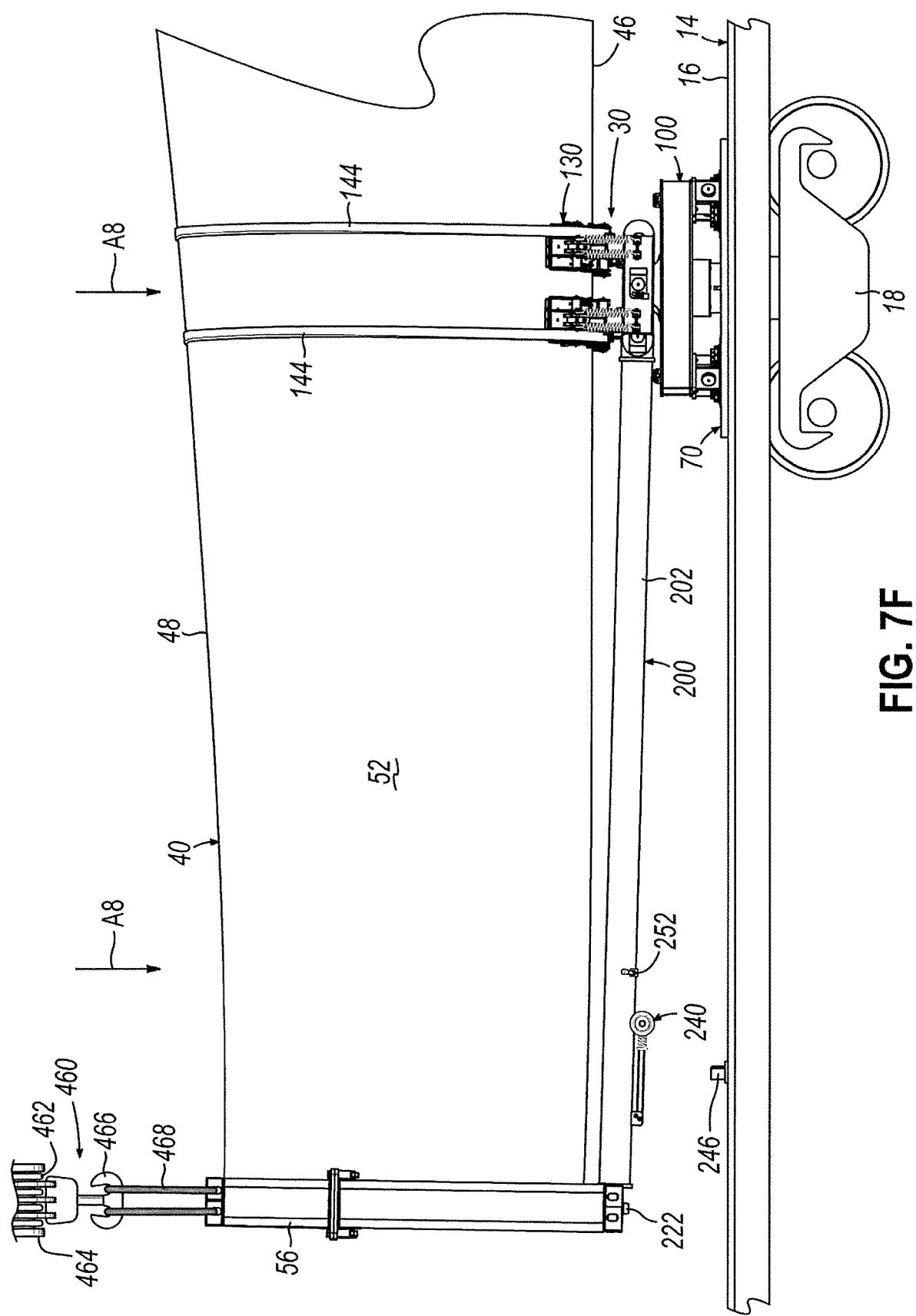

With the rigid arm 200 secured in place, the blade 40 may be lifted above and longitudinally aligned with the root bolster 30 with the leading edge 46 of the blade 40 facing downwardly by at least one second lifting arrangement 460 including a hoist rope 462, a sheave 464, a double hook 466, and a lifting cable 468 operatively attached to the root frame 56, as shown in FIG. 7D. While not shown, a third lifting arrangement may be operatively attached to the tip frame 58, such as for coordinated lifting of the entire blade 40. The blade 40 may then be advanced generally horizontally by the second lifting arrangement 460 to facilitate rigidly coupling the root frame 56 of the blade 40 to the distal end 206 of the rigid arm 200, such as via the distal eyelet 212 and locking pin 222, as indicated by the arrow A5 in FIG. 7D. With the root frame 56 rigidly coupled to the distal end 206 of the rigid arm 200, thereby providing a linkage between the root end 42 of the blade 40 and the upper cradle 130 of the root bolster 30, the root end 42 of the blade 40 may be lifted slightly upwardly, as indicated by the arrow A6 in FIG. 7E, to allow the articulating leg 240 to be rotated over the barrier 246 and returned to the retracted position, as indicated by the arrow A7 in FIG. 7E. In one embodiment, the locking mechanism for the articulating leg 240 may be re-engaged, such as by moving the lever 252 to the "on" position, to secure the articulating leg 240 in the retracted position. The root end 42 of the blade 40 may then be lowered downwardly toward the bed 16 of the railcar 14, as indicated by the arrows A8 in FIG. 7F, to allow the portions of the pressure side 50 and suction side 52 at or near the leading edge 46 of the blade 40 to rest on the saddles 138 of the root bolster 30 at a position inboard of the root end 42 by approximately the same length as the length of the rigid arm 200. In one embodiment, the angle plate 170 may be secured in place prior to such lowering of the blade 40 in order to selectively fix a desired orientation of the upper cradle 130 relative to the lower turntable 100 about the first horizontal axis H1 for accommodating a particular shape or configuration of the blade 40. As described above, the saddles 138 may automatically adjust under the weight of the blade 40 to conform to the exterior surface thereof. The webbing straps or cordlash 144 may then be circumferentially wrapped around the blade 40 and at least a portion of the upper cradle 130 and/or lower turntable 100, such as the saddles 138 of the upper cradle 130.

With the blade 40 loaded onto the root bolster 30 as described above, the second lifting arrangement 460 may be selectively detached from the root frame 56. During subsequent transportation of the blade 40 via the train 12, longitudinal acceleration and/or deceleration forces are transmitted between the root end 42 of the blade 40 and the root fixture 70 via the rigid arm 200, while the saddles 138 primarily vertically support the blade 40 and the webbing straps or cordlash 144 primarily counteract any vertical acceleration forces acting on the blade 40. The entire blade 40, including the root end 42 thereof, rotates about the first vertical axis V1 along with the upper cradle 130, lower turntable 100, and rigid arm 200 of the root bolster 30 while rounding a curved section of the railroad thereby allowing the root end 42 of the blade 40 to swing out over and beyond the edge of the railcar 14 to efficiently utilize the available side clearances along the railroad. After the train 12 has reached the desired destination, the webbing straps or cordlash 144 may be unwrapped and the root frame 56 may be uncoupled from the rigid arm 200 of the root bolster 30 for removal of the blade 40 from the root bolster 30.

Figure 8A:
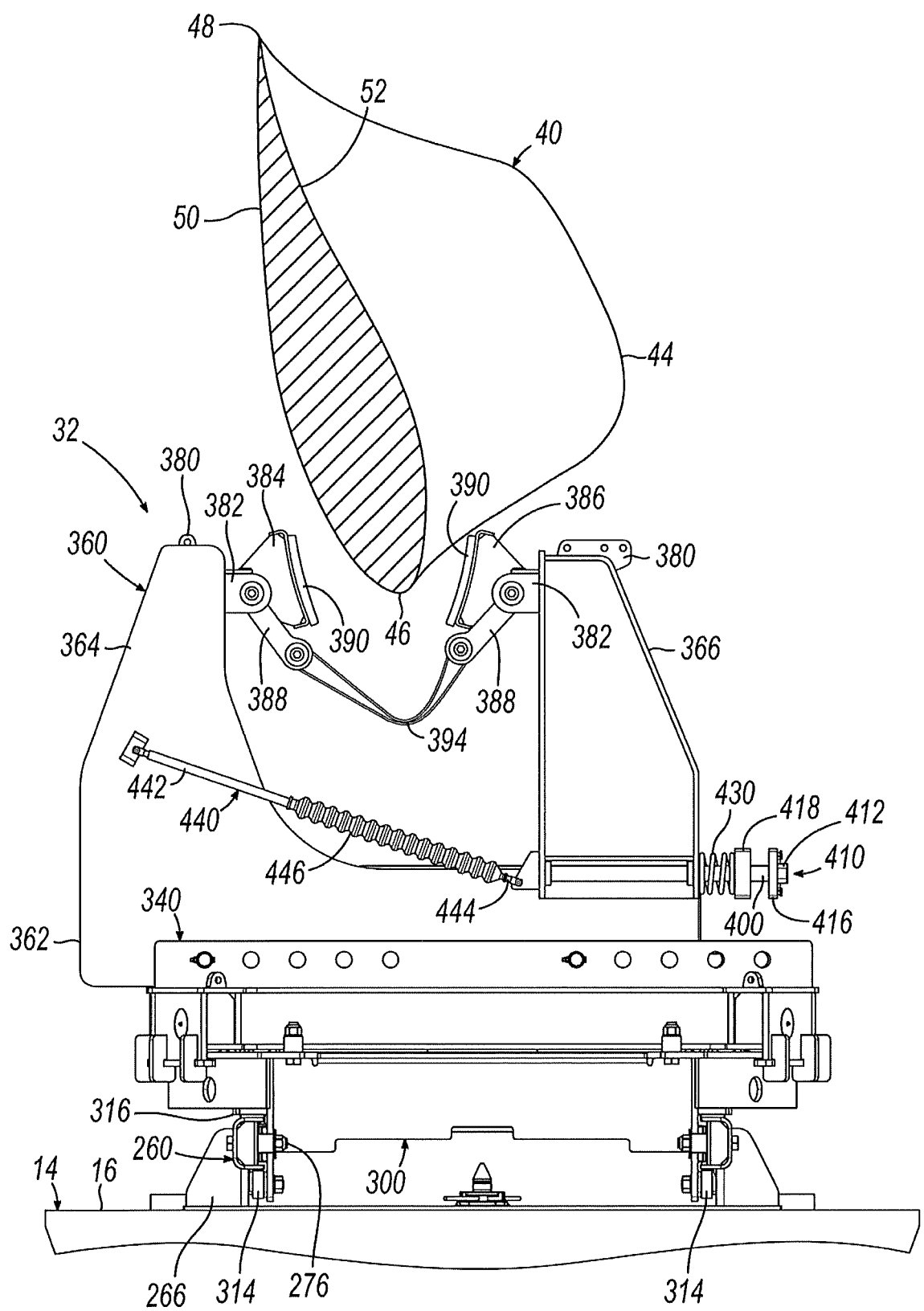
FIGS. 8A-8E are front elevation views of the tip bolster illustrating a method of loading the wind turbine blade onto the tip bolster.
Figure 8B:
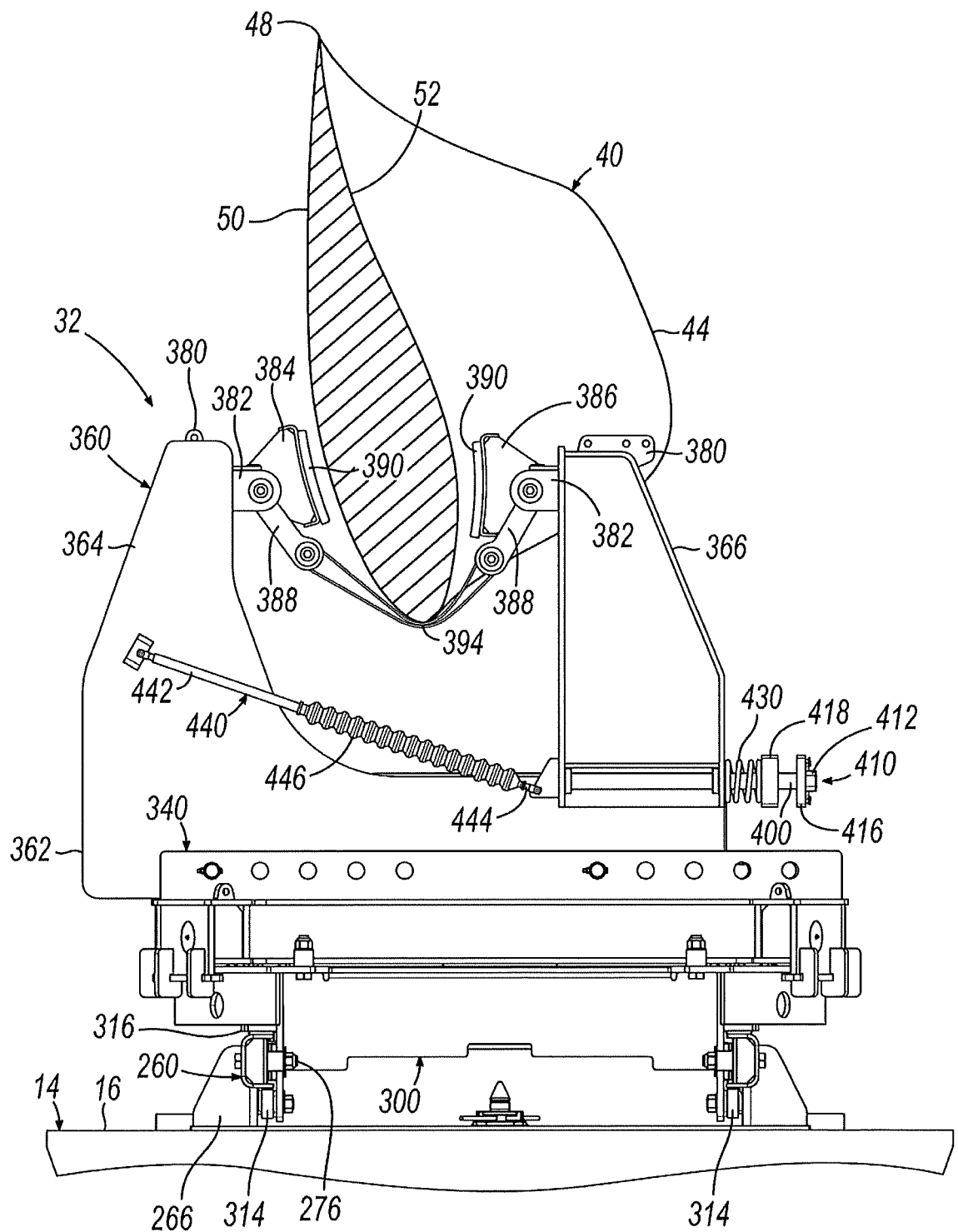
Figure 8C:
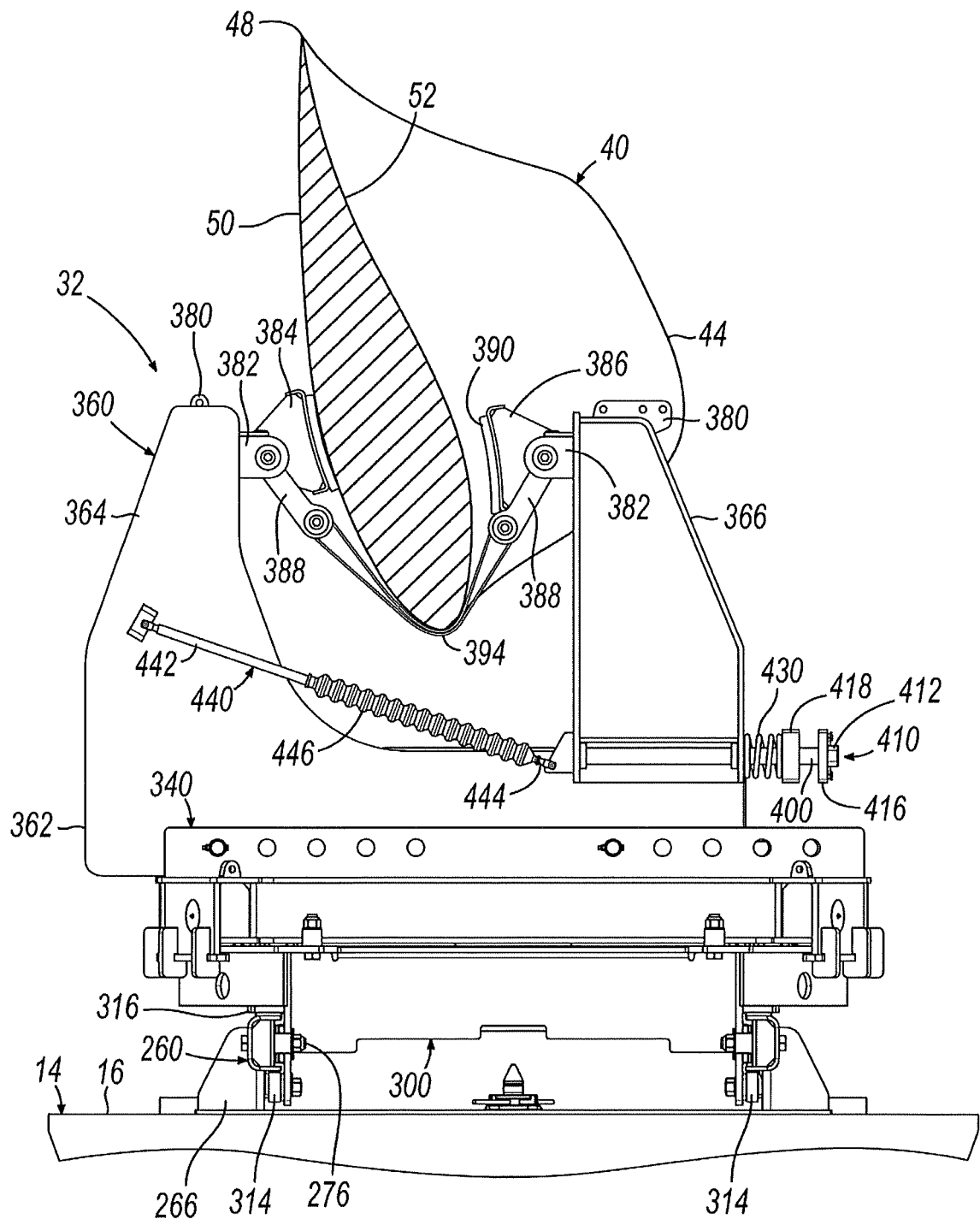
Figure 8D:
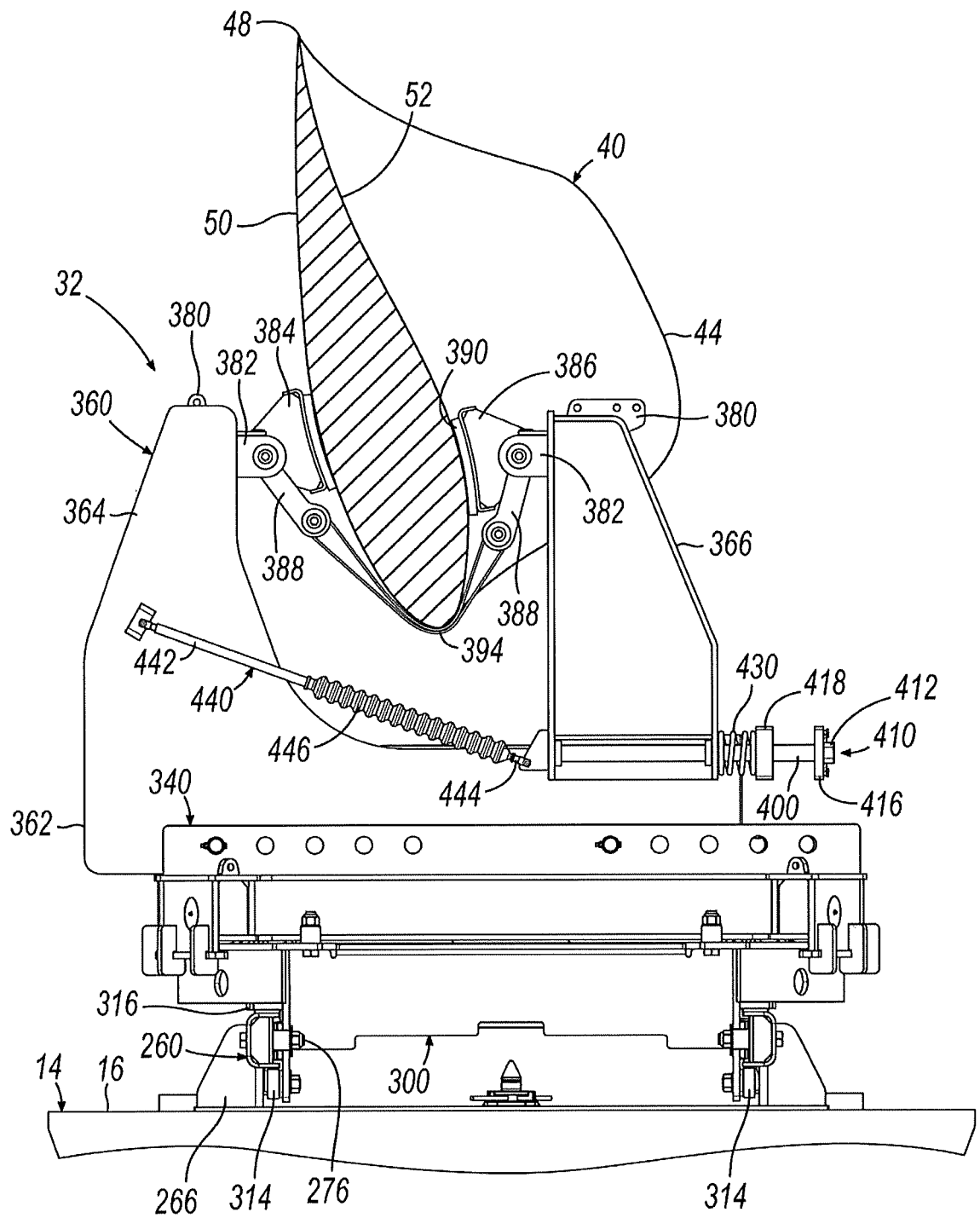
Figure 8E:
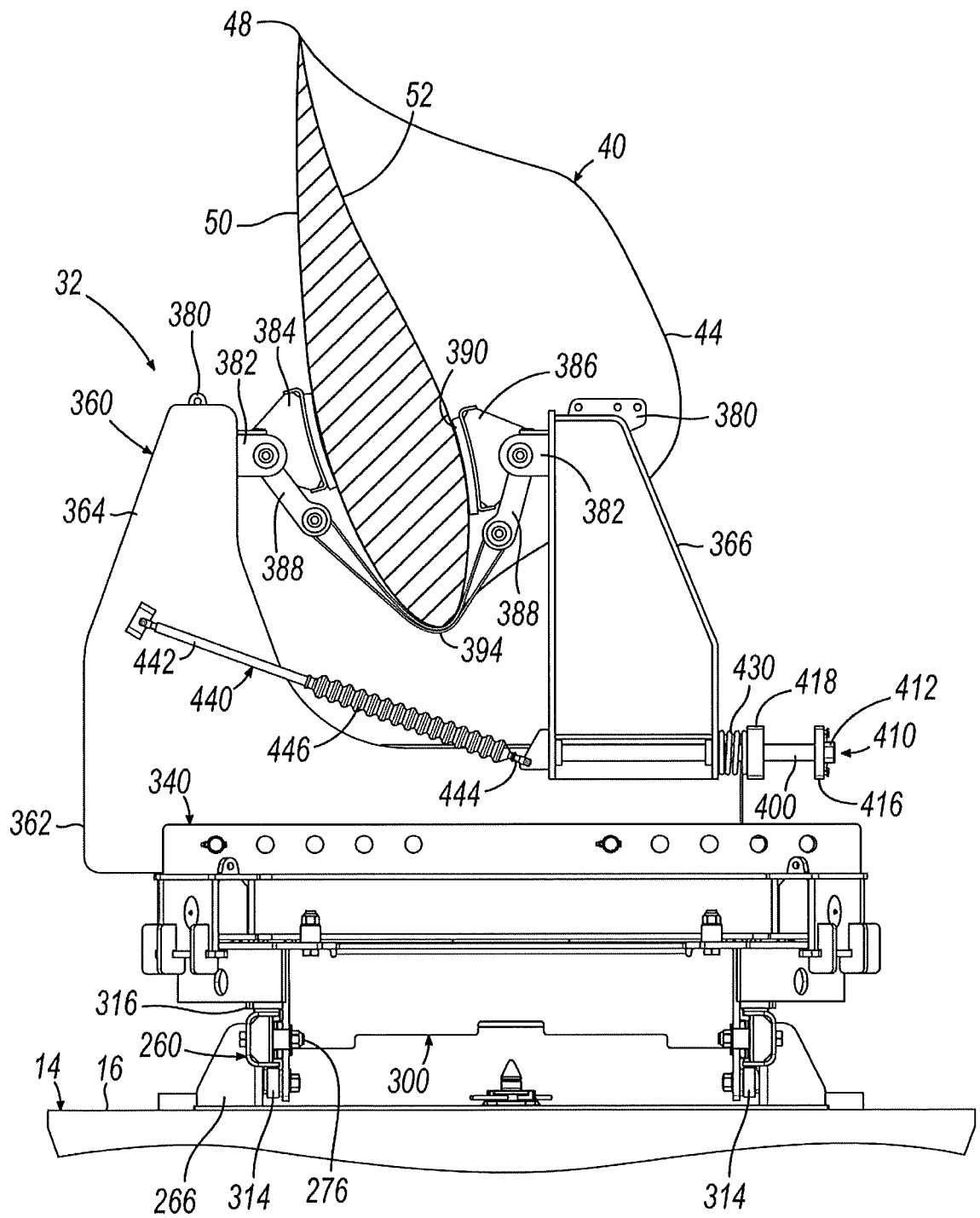
Figure 9A:
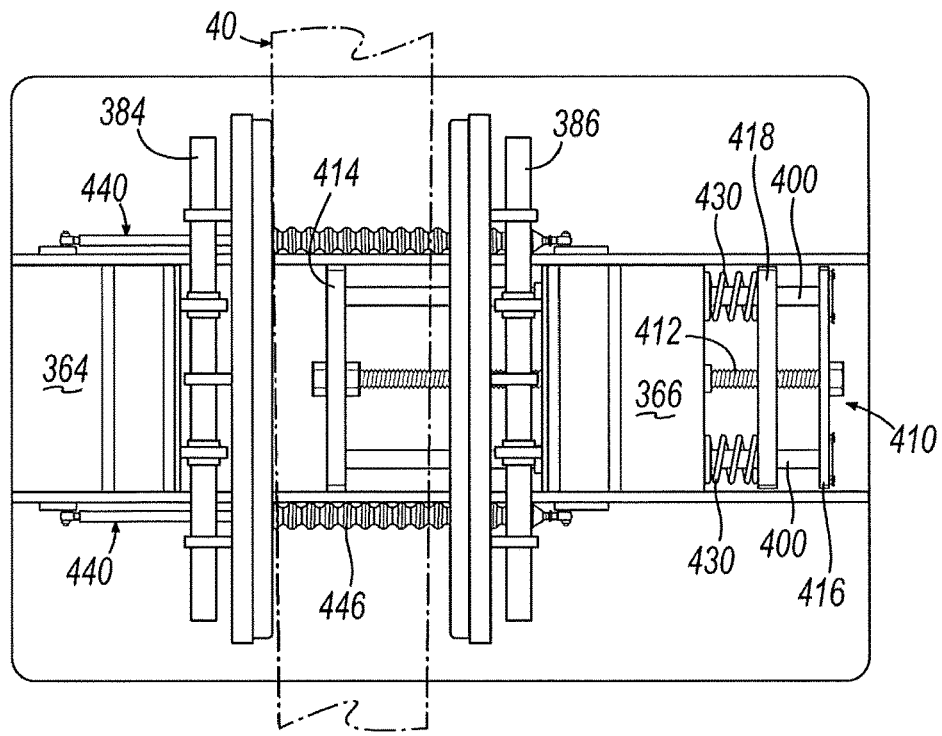
FIGS. 9A-9C are top elevation views of the tip bolster illustrating a method of loading the wind turbine blade onto the tip bolster.
Figure 9B:
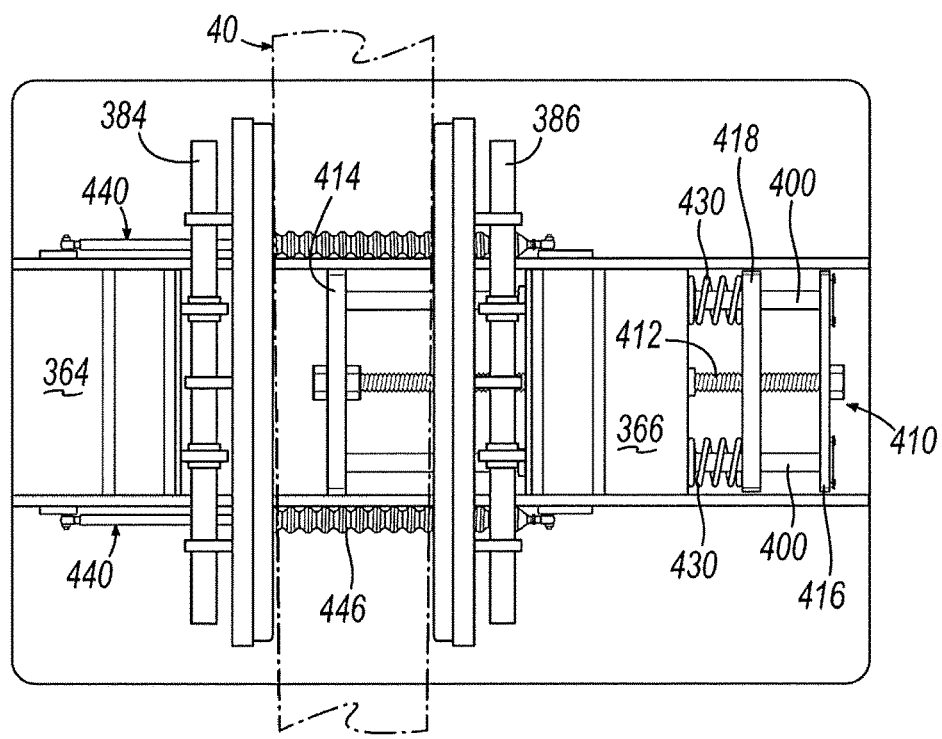
Figure 9C:
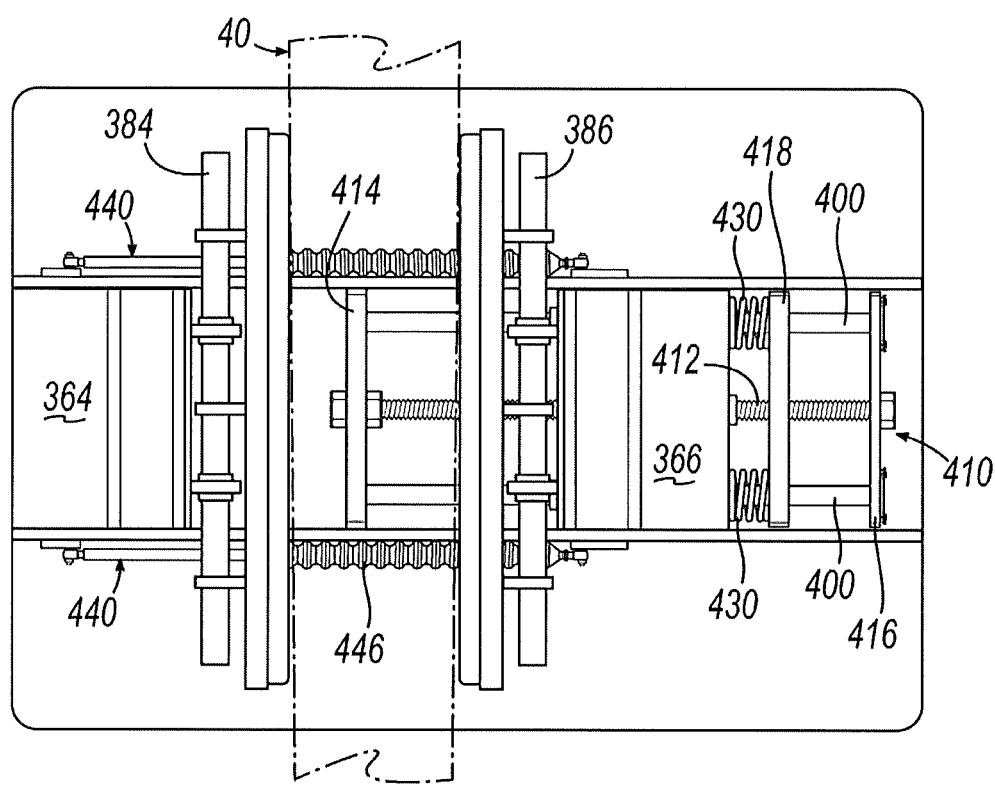

Referring now to FIGS. 8A-8E and 9A-9C, a method of loading the blade 40 onto the tip bolster 32 is provided. Initially, the second clamp arm 366 is spaced sufficiently far apart from the first clamp arm 364 to allow passage of the tip region 64 of the blade 40 between the jaws 384, 386, as shown in FIG. 8A. The tip region 64 of the blade 40 is then lowered toward the bed 16 of the railcar 14 with the leading edge 46 of the blade 40 facing downwardly to allow the leading edge 46 of the blade 40 to contact the pliable saddle 394, as shown in FIG. 8B, such as via a third lifting arrangement (not shown) operatively attached to the tip frame 58. In one embodiment, such lowering of the tip region 64 of the blade 40 may be performed concurrently with the lowering of the root end 42 of the blade 40 described above with respect to FIG. 7F. In any event, as the weight of the blade 40 is transferred to the pliable saddle 394, the blade 40 may rotate slightly about the longitudinal axis of the blade 40 to lean against the stationary jaw 384, and the pliable saddle 394 may tilt at least the movable jaw 386 toward the exterior surface of the blade 40, as shown in FIGS. 8C and 9A. The second clamp arm 366 may then be urged forward along the guide rods 400 to move the movable jaw 386 into contact with the blade 40 to press the blade 40 against the stationary jaw 384 for generating a desired clamping force, such as by operation of the actuator 410 including the drive screw 412, drive plate 418, and springs 430, as shown in FIGS. 8D and 9B. As described above, the jaws 384, 386 and/or saddle 394 may automatically adjust under the weight of the blade 40 to conform to the exterior surface thereof. The drive plate 418 may continue to move forward along the guide rods 400 after the desired clamping force has been generated to thereby compress or pre-load the springs 430, as shown in FIGS. 8E and 9C. After a desired amount of compression or pre-loading of the springs 430 has been achieved, which may be indicated by the drive plate 418 reaching a particular location along the guide rods 400, movement of the drive plate 418 may be halted and the drive plate 418 may be selectively fixed at the particular location along the guide rods 400 to maintain the desired clamping force on the blade 40.

With the blade 40 loaded onto the tip bolster 32 as described above, the third lifting arrangement may be selectively detached from the tip frame 58. The tip frame 58 may remain coupled to the tip region 64 of the blade 40 or may be decoupled therefrom. During subsequent transportation of the blade 40 via the train 12, longitudinal acceleration and/or deceleration forces are transmitted between the tip region 64 of the blade 40 and the tip fixture 260 via the upper clamp 360, which may also counteract any vertical acceleration forces acting on the blade 40, and the springs 430 may counteract any longitudinal creeping or slipping of the blade 40 to maintain a substantially continuous clamping force thereon, while the saddle 394 primarily vertically supports the blade 40. The entire blade 40, including the tip end 44 thereof, rotates about the second vertical axis V2 along with the upper clamp 360 and intermediate turntable 340 of the tip bolster 32 while rounding a curved section of the railroad thereby allowing the tip end 44 of the blade 40 to swing out over and beyond the edge of the railcar 14 to efficiently utilize the available side clearances along the railroad. During such rotation, the blade 40 may also translate along the rails 262 together with the upper clamp 360, intermediate turntable 340, and lower carriage 300 of the tip bolster 32 to accommodate any resulting changes in the profile of the train 12. After the train 12 has reached the desired destination, the drive plate 418 may be moved backward along the guide rods 400 and the spring-loaded separators 440 may urge the second clamp arm 336 backward to release the blade 40 from the jaws 384, 386 for removal of the blade 40 from the tip bolster 32.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A tip bolster for supporting a wind turbine blade on a railcar, the tip bolster comprising:
   a clamp including first and second clamp arms having first and second jaws, respectively, and being configured to be selectively movable relative to each other in a clamping direction for applying and releasing a clamping force on the blade interposed therebetween, via the first and second jaws, wherein the first and second clamp arms are configured to be urged relatively toward each other in response to a decrease in the clamping force.

2. The tip bolster of claim 1, wherein the clamp further includes at least one mechanical energy storage device configured to selectively store and release energy for urging at least one of the first and second clamp arms relatively toward the other of the first and second clamp arms in response to the decrease in the clamping force.

3. The tip bolster of claim 2, wherein the at least one mechanical energy storage device includes at least one spring.

4. The tip bolster of claim 1, wherein the clamp further includes at least one guide rod extending parallel to the clamping direction, and wherein the second clamp arm is movable toward and away from the first clamp arm along the at least one guide rod.

5. The tip bolster of claim 4, wherein the clamp further includes an actuator configured to effect movement of the second clamp arm along the at least one guide rod.

6. The tip bolster of claim 5, wherein the actuator includes a rotatable drive screw extending parallel to the clamping direction and a drive plate including at least one throughbore configured to slidably receive the at least one guide rod and a threaded bore configured to threadably receive the drive screw, such that rotation of the drive screw effects movement of the drive plate along the guide rods for urging the second clamp arm toward the first clamp arm and for allowing the second clamp arm to be moved away from the first clamp arm.

7. The tip bolster of claim 6, wherein the actuator further includes at least one mechanical energy storage device positioned between the drive plate and the second clamp arm and configured to selectively store and release energy between the drive plate and the second clamp arm for urging the second clamp arm toward the first clamp arm in response to the decrease in the clamping force.

8. The tip bolster of claim 7, wherein the at least one mechanical energy storage device includes at least one spring.

9. The tip bolster of claim 8, wherein the at least one spring is positioned about the at least one guide rod.

10. The tip bolster of claim 8, wherein the at least one spring is configured to be pre-loaded by the drive plate in response to continued movement of the drive plate toward the first clamp arm after the second jaw presses the blade against the first jaw.

11. The tip bolster of claim 10, wherein the at least one spring is configured to expand in response to the decrease in the clamping force to urge the second clamp arm toward the first clamp arm.

12. The tip bolster of claim 1, wherein the clamp further includes at least one spring-loaded separator extending between the first and second clamp arms for biasing the first and second clamp arms relatively away from each other in the clamping direction.

13. The tip bolster of claim 1, further comprising:
   a turntable configured to be pivotable relative to the railcar about a vertical axis, wherein the clamp is supported by the turntable.

14. The tip bolster of claim 1, further comprising:
   a carriage configured to be translatable along the railcar in a longitudinal direction thereof, wherein the clamp is supported by the carriage.

15. A transportation arrangement comprising:
the tip bolster of claim 1 positioned on and pivotable relative to a first railcar about a first vertical axis;
a root bolster positioned on and pivotable relative to a second railcar about a second vertical axis; and
a blade pivotably supported on the first railcar via the tip bolster and pivotably supported on the second railcar via the root bolster.

16. A method of transporting a wind turbine blade, comprising:
providing a railcar and a tip bolster mounted to the railcar, wherein the tip bolster includes a clamp having first and second clamp arms having first and second jaws, respectively;
interposing the blade between the first and second clamp arms;
selectively moving the first and second clamp arms relatively toward each other in a clamping direction for applying a clamping force on the blade via the first and second jaws; and
urging the first and second clamp arms relatively toward each other in the clamping direction in response to a decrease in the clamping force.

17. The method of claim 16, wherein urging the first and second clamp arms relatively toward each other includes selectively releasing energy from at least one mechanical energy storage device to at least one of the first and second clamp arms in response to the decrease in the clamping force.

18. The method of claim 17, wherein the at least one mechanical energy storage device includes at least one spring.

19. The method of claim 18, wherein selectively moving the first and second clamp arms relatively toward each other includes pre-loading the at least one spring.

20. The method of claim 16, further comprising:
releasing the blade from the first and second jaws via at least one spring-loaded separator extending between the first and second clamp arms for biasing the first and second clamp arms relatively away from each other in the clamping direction.

* * * * *